(12) United States Patent
Pranger et al.

(10) Patent No.: US 11,622,147 B2
(45) Date of Patent: Apr. 4, 2023

(54) BLURRING DIGITAL VIDEO STREAMS UPON INITIATING DIGITAL VIDEO COMMUNICATIONS

(71) Applicant: POPio IP Holdings, LLC, Sandy, UT (US)

(72) Inventors: Timothy Eugene Pranger, Eagle Mountain, UT (US); Ryanne Mayers, Sandy, UT (US); Robert Eric Roy, Riverton, UT (US); Austin Barnes, Riverton, UT (US)

(73) Assignee: POPio Mobile Video Cloud, LLC, Sandy, UT (US)

( * ) Notice: Subject to any disclaimer, the term of this patent is extended or adjusted under 35 U.S.C. 154(b) by 0 days.

(21) Appl. No.: 17/383,185

(22) Filed: Jul. 22, 2021

(65) Prior Publication Data
US 2023/0022986 A1   Jan. 26, 2023

(51) Int. Cl.
*H04N 21/431* (2011.01)
*H04N 21/4545* (2011.01)
(Continued)

(52) U.S. Cl.
CPC ......... *H04N 21/4318* (2013.01); *H04N 7/141* (2013.01); *H04N 21/4542* (2013.01); *H04N 21/45457* (2013.01)

(58) Field of Classification Search
CPC ........... H04N 21/4318; H04N 21/4542; H04N 21/45457; H04N 7/141
See application file for complete search history.

(56) References Cited

U.S. PATENT DOCUMENTS 7,360,234 B2 * 4/2008 Robson ............... H04N 7/0887
725/127
8,717,403 B1 * 5/2014 Kalevo ................. H04N 7/15
348/14.02

(Continued)

FOREIGN PATENT DOCUMENTS

CN       111164955 A  *  5/2020  ....... G06F 16/24575
EP       3860134 A1  *  8/2021  ......... G06K 9/00221

(Continued)

OTHER PUBLICATIONS

Fleck et al. "Finding Naked People," In Proceedings of the 4th European Conference on Computer Vision-vol. II (ECCV), pp. 593-602, London, UK, 1996.

(Continued)

*Primary Examiner* — James R Sheleheda
(74) *Attorney, Agent, or Firm* — Keller Preece PLLC

(57) ABSTRACT

This disclosure describes methods, non-transitory computer readable storage media, and systems that apply a blur filter to a digital video stream of a user to a recipient based on blur settings. The disclosed system receives a request to initiate a digital video communication between a first user (e.g., a customer) associated with a first user client device and a second user (e.g., an agent) associated with a second user client device. The disclosed system determines a blur setting (e.g., a degree of blur and an amount of time) associated with the second user indicating to blur a digital video stream from the first user client device at the second user client device. The disclosed system initiates the digital video communication by presenting a blur filter on the digital video stream according to the blur setting for display at the second user client device.

20 Claims, 14 Drawing Sheets

(51) Int. Cl.
*H04N 21/454* (2011.01)
*H04N 7/14* (2006.01)

(56) References Cited

U.S. PATENT DOCUMENTS

| | | | |
|---|---|---|---|
| 9,531,998 B1 | 12/2016 | Farrell et al. | |
| 9,762,729 B1* | 9/2017 | Sales | H04L 61/4594 |
| 9,794,511 B1* | 10/2017 | McQueen | H04N 7/147 |
| 9,848,167 B1* | 12/2017 | Christian | H04N 7/147 |
| 10,554,931 B1* | 2/2020 | Zavesky | G06V 10/768 |
| 10,580,149 B1* | 3/2020 | Lakshminarayanan | H04N 5/23203 |
| 10,749,867 B1 | 8/2020 | Litani | |
| 10,944,805 B1* | 3/2021 | Zhong | H04L 65/61 |
| 2003/0126267 A1* | 7/2003 | Gutta | G06F 21/6209 |
| | | | 709/229 |
| 2008/0012935 A1* | 1/2008 | Echtenkamp | H04N 21/6181 |
| | | | 348/14.02 |
| 2008/0298571 A1* | 12/2008 | Kurtz | G06F 3/017 |
| | | | 348/E7.083 |
| 2010/0046931 A1 | 2/2010 | Takao et al. | |
| 2012/0026274 A1* | 2/2012 | Baker | H04L 65/1066 |
| | | | 348/E7.083 |
| 2012/0042289 A1 | 2/2012 | Cragun | |
| 2014/0038546 A1 | 2/2014 | Neal et al. | |
| 2015/0067717 A1* | 3/2015 | Oliver | H04N 21/41415 |
| | | | 725/28 |
| 2015/0070516 A1* | 3/2015 | Shoemake | H04N 21/4542 |
| | | | 348/207.11 |
| 2015/0215579 A1* | 7/2015 | Wang | H04N 7/147 |
| | | | 348/14.11 |
| 2015/0229882 A1* | 8/2015 | Liu | H04N 7/15 |
| | | | 348/14.08 |
| 2017/0374194 A1* | 12/2017 | Sales | H04W 4/02 |
| 2019/0289258 A1* | 9/2019 | Peterson | G06K 9/00268 |
| 2020/0260186 A1 | 8/2020 | Stachura | |
| 2020/0387995 A1* | 12/2020 | Bucciarelli | H04W 4/00 |
| 2021/0099672 A1* | 4/2021 | Ahn | H04N 7/147 |
| 2021/0149441 A1* | 5/2021 | Bartscherer | G06F 1/1616 |
| 2021/0243408 A1* | 8/2021 | Ahn | H04N 7/147 |
| 2022/0046074 A1 | 2/2022 | Zhong | |

FOREIGN PATENT DOCUMENTS

| | | | | |
|---|---|---|---|---|
| EP | 3628120 B1 | * | 10/2021 | G06F 16/24575 |
| JP | 4963875 B2 | * | 6/2012 | |
| WO | WO-2018060863 A1 | * | 4/2018 | G06F 11/1461 |
| WO | WO-2018194243 A1 | * | 10/2018 | G06K 9/00711 |

OTHER PUBLICATIONS

U.S. Appl. No. 17/383,191, dated Sep. 6, 2022, Office Action.

* cited by examiner

BLURRING DIGITAL VIDEO STREAMS UPON INITIATING DIGITAL VIDEO COMMUNICATIONS

BACKGROUND

Many modern businesses create software applications (e.g., mobile applications) meant to improve accessibility to the business and allow a user to perform some desired function or access information on a client device (e.g., mobile device, laptop, etc.). For example, some businesses, such as banks, may create a software application to provide customers a convenient alternative to visiting a brick and mortar branch of the business. To illustrate, software applications can include operations for exchanging information (e.g., documents), creating accounts, initiating transactions, or otherwise conducting business via digital communications. This allows the user flexibility in determining when and where to interact with the business.

Additionally, improvements to computer processing and networking technologies have led to significant advancements in the fields of video conferencing. For instance, many systems provide capabilities for users to engage in user-to-user or user-to-business video communications. Accordingly, integrating video communication options in software applications designed for users to interact with business provides the users with additional alternatives to in-person interactions. Specifically, digital video communications can provide an enhanced interaction experience over text or audio communications, thereby improving the abilities of businesses to assist consumers (or prospective customers).

While digital video communications provide improved communication options between users and businesses, conventional communication systems have several technological shortcomings. In particular, conventional systems that provide video communications (e.g., via two-way video or video conferencing software applications) lack safety and security protocols related to video communications. Specifically, especially for businesses, most video communications are in-bound video requests from unknown users, which results in recipient users not knowing who is requesting the video communication until a connection is established. While conventional systems typically allow recipients to reject calls from unknown users, such measures do not protect the recipients from seeing content that they may not want to see. For example, inattentive users or malicious users requesting to engage in video communications with recipients can result in the recipients seeing content such as requesting users in inappropriate stages of dress or offensive content. Thus, the conventional systems fail to provide a safe and secure communication environment for recipients of video communication requests.

SUMMARY

This disclosure describes one or more embodiments of methods, non-transitory computer readable media, and systems that solve the foregoing problems (in addition to providing other benefits) by applying a blur filter to a digital video stream of a user to a recipient based on blur settings. In particular, the disclosed systems receive a request to initiate a digital video communication between a first user (e.g., a customer user) associated with a first user client device and a second user (e.g., an agent user) associated with a second user client device. The disclosed systems determine a blur setting associated with the second user indicating to blur a digital video stream from the first user client device at the second user client device. For example, the blur setting can indicate a degree of blur and an amount of time to blur the digital video stream. The disclosed systems then initiate the digital video communication by presenting a blur filter on the digital video stream according to the blur setting (e.g., with the degree of blur for the amount of time) for display at the second user client device. Accordingly, the disclosed systems allow recipient users to control how much blur and how long the blur is applied to each digital video stream received at the recipient user's client device.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

The detailed description refers to the drawings briefly described below.

DETAILED DESCRIPTION

Figure 1:
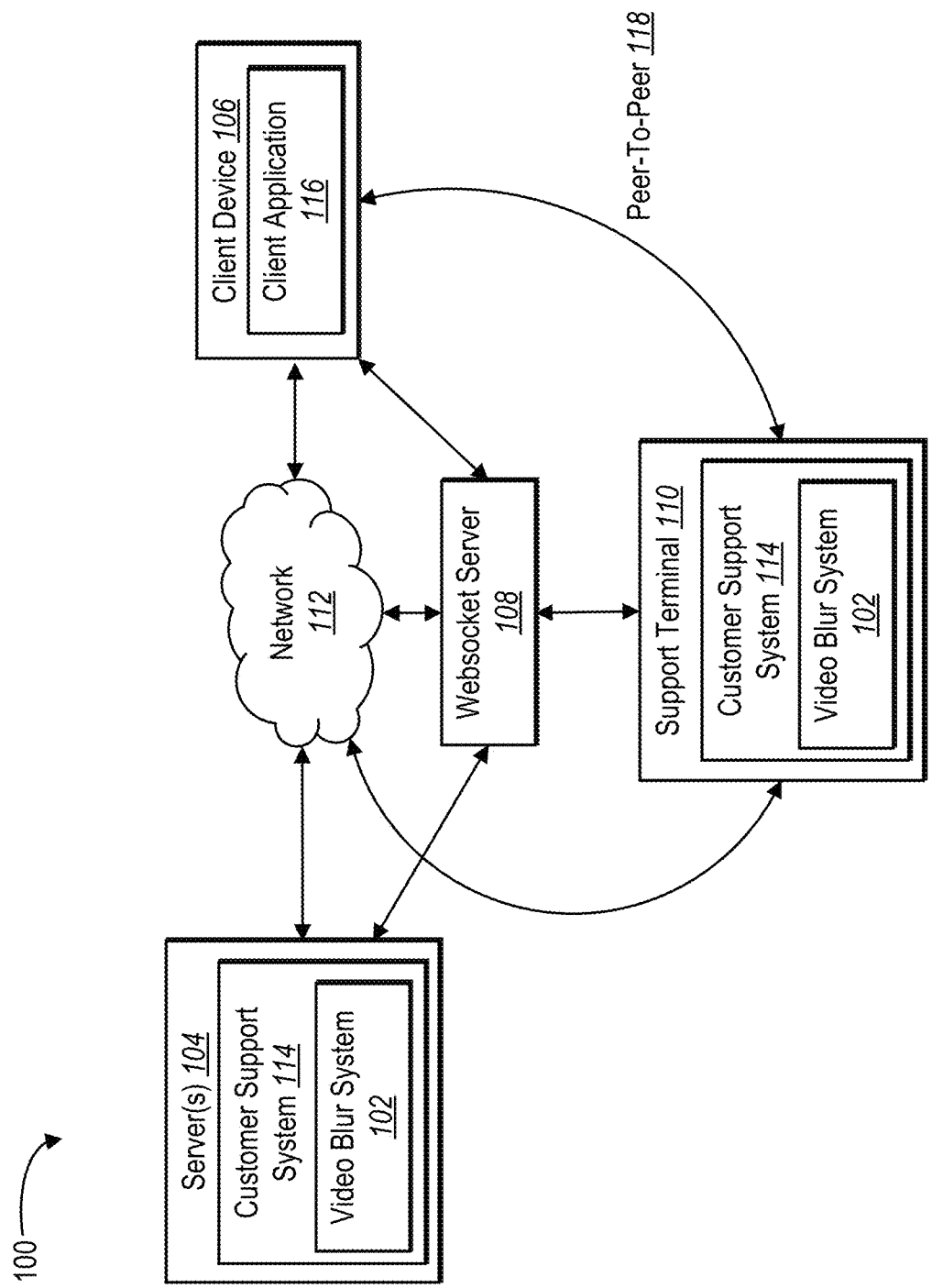
FIG. 1 illustrates a block diagram of a system environment in which a video blur system is implemented in accordance with one or more implementations.

This disclosure describes one or more embodiments of a video blur system that improves computing systems that provide digital video communications between users by applying blur to a digital video stream for presentation to a user based on blur settings for the user. Specifically, in one or more embodiments, in response to receiving a request to initiate a digital video communication between a first user and a second user, the video blur system determines a blur setting associated with the second user for generating a blur filter. For example, the video blur system can generate a blur filter based on a degree of blur and an amount of time from blur settings associated with the second user. The video blur system then initiates the digital video communication between the first user and the second user by applying the blur filter to a digital video stream received from a first user client device associated with the first user and presenting the resulting blurred digital video stream at a second user client device associated with the second user for the specified amount of time. Accordingly, the video blur system improves the security of digital video communications between a plurality of users.

As mentioned, in one or more embodiments, the video blur system receives a request to initiate a digital video communication between a first user and a second user. For example, the video blur system can receive a request to initiate a digital video communication involving the first user and the second user associated with a first user client device and a second user client device, respectively. To illustrate, the video blur system can receive the request from the first client device to engage in a two-way digital video communication between the first user (e.g., a consumer user) and the second user (e.g., an agent user). More specifically, the request can include a request to present digital video streams of the first user and the second user between the first user client device and the second user client device.

In response to a request to initiate a digital video communication, the video blur system determines a blur setting for generating a blur filter. Specifically, the video blur system determines one or more attributes for generating a blur filter based on blur settings associated with a recipient of a digital video stream. In one or more embodiments, the recipient establishes blur settings indicating a degree of blur to apply to digital video streams presented to the recipient at a user client device of the recipient. To illustrate, if the recipient is an agent providing customer support, the agent can establish blur settings with the video blur system by utilizing blur setting elements presented within a graphical user interface (e.g., a slider element and/or a numerical field) to indicate values for one or more attributes of a blur filter. Additionally, the video blur system can determine the blur settings from a user account of the recipient.

In one or more embodiments, the video blur system utilizes blur settings of a user to generate a blur filter to apply to a digital video stream. For example, the video blur system generates a blur filter including a degree of blur indicated in the blur settings of the user. The video blur system can thus generate the blur filter with the degree of blur to apply to one or more digital video streams of one or more additional users involved in a digital video communication with the user. In one or more alternative embodiments, the blur settings are default setting that a user can optionally modify.

According to one or more embodiments, after or otherwise in connection with generating a blur filter, the video blur system initiates the digital video communication. In particular, the video blur system applies the blur filter to a digital video stream presented at a client device of a user for which the video blur system generates the blur filter. To illustrate, for a digital video communication involving a first user and a second user in which the second user has established blur settings, the video blur system applies a generated blur filter to a digital video stream of the first user received from a first user client device for presenting at a second user client device associated with the second user. In addition, in one or more embodiments, because the blur filter corresponds to the second user, the video blur system does not apply the blur filter to the digital video stream from the first client device when presenting the digital video stream at the first client device.

In one or more additional embodiments, the video blur system utilizes the blur settings to determine how long to apply the blur filter to the digital video stream at the second client device. For instance, as mentioned, the video blur system determines the amount of time to apply the blur filter from the blur settings associated with the second user. The video blur system then applies the blur filter to the digital video stream for the specified amount of time at the second client device. After the amount of time has passed, the video blur system removes the blur filter from the digital video stream at the second client device and presents the unblurred digital video stream at the second client device. Accordingly, the video blur system provides security settings to allow recipient users (e.g., the second user) to screen digital video streams prior for potentially inappropriate or offensive content at the start of each digital video stream.

In one or more embodiments, the video blur system provides fading blurring of a digital video stream. For example, the video blur system can determine an initial degree of blur based on the user or default settings. Then the video blur system can reduce the degree of blur at predefined time intervals such that the video blur system cause the digital video stream to fade into clarity over time. In this manner, the user at the second client device can evaluate the scene in the digital video stream at different levels of clarity to aid in making a decision to accept or cancel the video call. In still further embodiments, the video blur system can apply a gradient based blur that constantly fades into clarity over a specified time interval.

Additionally, in some embodiments, the video blur system applies a blur filter to each digital video stream presented at a client device according to blur settings associated with the client device. For example, the video blur system can generate a blur filter based on blur settings associated with a user and then apply the blur filter to a plurality of digital video streams presented at a client device of the user. To illustrate, the video blur system applies the blur filter to a plurality of digital video streams for a digital video conference involving two or more additional users for a specified amount of time at the client device of the user. The video blur system can also apply the blur filter to new digital video streams added to a digital video communication after previously initiating the digital video communication (e.g., when a third user is added to a digital video communication involving a first and second user).

The disclosed video blur system can provide a number of technical advantages over conventional systems. For example, the video blur system can improve safety and security of computing systems that provide digital video communications between two or more computing devices. To illustrate, in contrast to conventional systems that merely allow users to reject requests from unknown users, the video blur system can provide additional security for recipients of requests for digital video communications in situations for which rejecting requests is not common practice (e.g., in customer support positions). Indeed, by providing an option for a user to apply a blur filter to digital video streams received from other users upon initiating digital video communications with the other users, the video blur system can safely initiate the communications without exposing the user to inappropriate or offensive content.

Additionally, the video blur system can improve the flexibility of computing systems by providing a variety of customizable blur settings for generating blur filters. For instance, the video blur system presents a graphical user interface that includes a variety of controls for establishing various attributes of a blur filter. To illustrate, the video blur system allows users to control a degree of blur and an amount of time to apply the blur to digital video streams presented at the user's client device. Thus, the video blur system provides the flexibility to automatically blur received digital video streams upon initiating digital video communications (or adding additional digital video streams to an existing digital video communication) as much or as little as users desire, depending on personal preference.

As illustrated by the foregoing discussion, the present disclosure utilizes a variety of terms to describe features and advantages of the video blur system. Additional detail is now provided regarding the meaning of such terms. For example, as used herein, the term "digital video communication" refers to a communication having a video element. In particular, a digital video communication can refer to a multi-directional communication involving at least two computing devices such as a first user client device and a second user client device in which users of the computing devices (e.g., a customer user and an agent or support representative) can communicate, and at least one of the computing devices displays a video capturing a video element of the communication. For example, at least one of the computing devices can display a video stream captured by a camera associated with the at least one other computing device participating in the digital video communication.

Additionally, as used herein, the term "digital video stream" refers to video content captured at a first client device during a digital video communication. For example, a digital video stream can include real-time video of a user captured by a first client device to provide to a second client device involved in a digital video communication with the first client device. In one or more embodiments, a digital video communication includes a plurality of digital video streams from a plurality of client devices involved in the digital video communication for providing to the client devices involved in the digital video communication.

As used herein, the term "blur filter" refers to a computing software component that applies a visual distortion to digital image or digital video. For instance, a blur filter includes a modification to a digital video stream from a client device to distort or soften details of the digital video stream. For example, a blur filter can include, but is not limited to, a Gaussian blur, a radial blur, or a motion blur to soften color boundaries by modifying pixel values of a digital image (e.g., individual video frames) as presented on a display device.

As used herein, the term "blur setting" refers to one or more values associated with one or more attributes of a blur filter. Specifically, a blur setting includes, but is not limited to, a degree of blur indicating how much distortion to apply to a digital video stream in a blur filter and an amount of time to apply the blur filter to the digital video stream. Accordingly, as used herein, the term "blur attribute" refers to an attribute of a blur filter that determines a visual effect of the blur filter when applied on a digital video stream. In one or more embodiments, a blur setting is stored within a user account of a user for generating blur filters for one or more digital video streams presented at one or more client devices of the user.

As used herein, the term "blur setting element" refers to a graphical user interface element for setting one or more attributes of a blur filter. To illustrate, a blur setting element can include, but is not limited to a slider element, a text entry field, a dropdown menu, or other graphical user interface element that allows for selecting or entering a value associated with visual attributes of a blur filter. For example, a blur setting element allows for selection of a numerical value for certain blur attributes (e.g., a degree of blur or an amount of time). In additional embodiments, a blur setting element allows for selection of a blur type of a blur filter.

As used herein, the term "agent" refers to a representative of an entity. For example, an agent can include, but is not limited to, a support representative of a business (e.g., a bank). In some embodiments, an agent has duties to interact with users (e.g., customers) to provide information associated with an entity or provide assistance in performing operations associated with the entity. Additionally, an agent can be associated with one or more client devices (e.g., an agent client device) for use in engaging in digital video communications with users.

Turning now to the figures, FIG. 1 includes an embodiment of a system environment 100 in which a video blur system 102 operates. In particular, the system environment 100 includes server(s) 104, a client device 106, a Websocket server 108, and a support terminal 110 in communication via a network 112. Moreover, as shown, the server(s) 104 include a customer support system 114 (or a portion of the customer support system 114), which further includes the video blur system 102 (or a portion of the video blur system 102). Additionally, or alternatively, the support terminal 110 includes the customer support system 114 (or a portion of the customer support system 114), which includes the video blur system 102 (or a portion of the video blur system 102). As illustrated, the client device 106 includes a client application 116.

As shown in FIG. 1, the server(s) 104 include or host the customer support system 114. Specifically, the customer support system 114 includes, or is part of, one or more systems that implement digital communications between two or more users of the customer support system 114. For example, the customer support system 114 at the server(s) 104 establishes a connection between the client device 106 and the support terminal 110 (e.g., an agent client device) in response to a request to initiate a digital video communication sent to the customer support system 114 by the client device 106. In particular, the customer support system 114 establishes the connection to allow transmission of a digital video communication between the client device 106 and the support terminal 110. Additionally, in response to the customer support system 114 establishing the connection, the customer support system 114 conducts a digital video communication between the client device 106 and the support terminal 110 via the connection. Accordingly, a user and an agent can interact with the client device 106 and the support terminal 110, respectively, to communicate with one another via the digital video communication.

As illustrated, in one or more embodiments, the server(s) 104 comprises one server. Alternatively, the server(s) 104 may comprise a plurality of servers. For example, the server(s) 104 can comprise a video load balance server, a signaling server, and a STUN/TURN server. The video load balance server serves to direct communications to an available support terminal, the signaling server notifies the support terminal 110 of a request to initiate a digital video communication, and the STUN/TURN server serves to work through secure firewalls to establish the connection. Alternatively, any other combinations and types of servers sufficient to establish a connection may be used as part of the server(s) 104.

Additionally, as mentioned, the server(s) 104 can execute or implement at least a portion of the customer support system 114. In particular, in one or more embodiments, the customer support system 114 utilizes the server(s) 104 to conduct digital video communications between a support terminal (e.g., the support terminal 110) and a client device (e.g., the client device 106), provide content to the client device (e.g., display elements for display within the client application 116), and receive data resulting from interaction with the content. For example, in one or more embodiments, the customer support system 114, via the server(s) 104, can conduct a digital video communication between the client device 106 and a support terminal 110, where the digital video communication is transmitted through a first connection (e.g., a first connection between the client device 106 and the support terminal 110). The customer support system 114, via the server(s) 104, can further transmit content to the client device 106 via a second connection (e.g., a second connection between the support terminal and the client device 106). During the digital video communication, customer support system 114, via the server(s) 104, can receive data resulting from interaction with the content within the client application 116 at the client device 106.

As shown in FIG. 1, the customer support system 114 at the server(s) 104 includes the video blur system 102. Indeed, in one or more embodiments, the customer support system 114 executes or implements the video blur system 102 in order to facilitate the blurring of digital video streams presented at the support terminal 110. To illustrate, the customer support system 114 can use the video blur system 102 to generate a blur filter based on blur settings for an agent associated with the support terminal 110. The video blur system 102 can then apply the blur filter to digital video streams presented at the support terminal 110 upon initiating digital video communications involving the support terminal 110 and one or more client devices (e.g., the client device 106). For instance, the video blur system 102 uses the blur settings to determine a degree of blur to apply to a digital video stream presented at the support terminal 110 and how long to apply the blur filter to the digital video stream during a digital video communication.

As shown in FIG. 1, the system environment 100 also includes the support terminal 110. The support terminal 110 may comprise a computing device (e.g., an agent client device associated with an agent), such as those described below in relation to FIG. 12. For example, the support terminal 110 may comprise one or more personal computers, laptop computers, mobile devices, mobile phones, tablets, special purpose computers, televisions, or other computing devices. As shown, in some embodiments, the support terminal 110 can also include the customer support system 114 (or a portion of the customer support system 114) and the video blur system 102 (or a portion of the video blur system 102). Indeed, in one or more embodiments, the support terminal 110 can execute or implement the customer support system 114. In some embodiments, the support terminal 110 executes or implements all features of the customer support system 114. In some embodiments, however, the support terminal 110 executes or implements a subset of the features of the customer support system 114. For example, the support terminal 110 can implement a first subset of features of the customer support system 114 and the server(s) 104 can implement a second subset of features of the customer support system 114 (which may, or may not, overlap with the first subset of features).

In one or more embodiments, the client device 106 includes a client device that allows a user of the device to receive and interact with content (e.g., display elements). For example, the client device 106 can include a smartphone, a tablet, a desktop, a computer, a laptop computer, or another electronic device. The client device 106 can include one or more applications (e.g., the client application 116) that allow the user to receive and interact with content. For example, the client application 116 can include a software application installed on the client device 106. Additionally, or alternatively, the client application 116 can include a software application hosted on the server(s) 104 or support terminal 110, which may be accessed by the client device 106 through another application, such as a web browser.

In one or more embodiments, the server(s) 104 include a variety of computing devices, including those described below with reference to FIG. 12. For example, the server(s) 104 include one or more servers for storing and processing data associated with digital images. In some embodiments, the server(s) 104 also include a plurality of computing devices in communication with each other, such as in a distributed storage environment. In some embodiments, the server(s) 104 include a content server. The server(s) 104 can also include an application server, a communication server, a web-hosting server, a social networking server, a digital content campaign server, or a digital communication management server.

As is also illustrated in FIG. 1, the system environment 100 may also include the Websocket server 108. The Websocket server 108 may generate, store, receive, and transmit any type of data, including a display element trigger (not shown) for presenting display elements to the client device 106. For example, the Websocket server 108 may receive and push a display element trigger sent from the support terminal 110 to the client device 106.

As shown in FIG. 1, the support terminal 110 can communicate with the client device 106 through the server(s) 104, the WebSocket server 108, and/or the peer-to-peer connection 118. For example, the support terminal 110 can communicate with the client device 106 using two or more channels of communication. To illustrate, the support terminal 110 can conduct a digital video communication with the client device 106 through the server(s) 104 or the peer-to-peer connection 118 while concurrently pushing display element triggers (and, possibly, the corresponding display elements) to the client device 106 through the Web Socket server 108.

In particular, the peer-to-peer connection 118 serves as a direct connection between the support terminal 110 and the client device 106. In one or more embodiments, the peerto-peer connection 118 can serve to substitute for the server(s) 104. For example, after the server(s) 104 establishes the connection between the support terminal 110 and the client device 106, the support terminal 110 can subsequently establish the peer-to-peer connection 118 and conduct the digital video communication over that connection. As used herein, a peer-to-peer (P2P) connection is created when two or more client computing devices are connected and share resources without going through a separate server computing device (e.g., the server(s) 104). The peer-to-peer connection 118 can provide a solution to bandwidth limitations that restrict the maximum number of concurrent video streams possible through the server(s) 104. The peer-to-peer connections, where possible, maximize the number of possible simultaneous video calls.

In one or more embodiments, the server(s) 104 may first determine if the peer-to-peer connection 118 is available. For example, the peer-to-peer connection 118 may be unavailable due to limitations or the configuration of the hardware or software within the system environment 100. For example, video relays between client devices on restrictive networks and firewalls are often blocked. Network address translation limits the client device's ability to have peer-to-peer connections. In one or more embodiments, the server(s) 104 detects when a peer-to-peer connection is not possible. If the server(s) 104 determines that the peer-to-peer connection 118 is not available, then the server(s) 104 may maintain (or reroute) the connection for the digital video communication. In an alternative embodiment, the server(s) 104 may maintain the connection with a client device whether or not the peer-to-peer connection 118 is available.

As mentioned, the customer support system 114 can be implemented in whole, or in part, by the individual elements of the system environment 100. Although FIG. 1 illustrates the customer support system 114 being implemented by the server(s) 104 and/or the support terminal 110, it will be appreciated that one or more components of the customer support system 114 can be implemented in a variety of the components of the system environment 100. For example, one or more components of the customer support system 114 can be implemented by a client device.

Furthermore, although the system environment 100 of FIG. 1 is depicted as having a particular number of components, the system environment 100 can have any number of additional or alternative components (e.g., any number or servers, Websocket servers, support terminals, client devices, or other components in communication with the customer support system 114 via the network 112). Additionally, the video blur system 102 can be implemented in one or more additional systems for blurring digital video streams between a plurality of client devices of users associated with the additional system(s) (e.g., instead of digital video communications involving the support terminal 110 via the customer support system 114). Similarly, although FIG. 1 illustrates a particular arrangement of the server(s) 104, the network 112, the Websocket server 108, the support terminal 110, and the client device 106, various additional arrangements are possible.

The server(s) 104, the network 112, the Websocket server 108, the support terminal 110, and the client device 106 may be communicatively coupled with each other either directly or indirectly (e.g., through the network 112 as discussed in greater detail below in relation to FIG. 12). Moreover, the server(s) 104, the Websocket server 108, the support terminal 110, and the client device 106 may include a variety of computing devices (including one or more computing devices as discussed in greater detail with relation to FIG. 12).

Additionally, as shown in FIG. 1, the system environment 100 includes the network 112. The network 112 enables communication between components of the system environment 100. In one or more embodiments, the network 112 may include the Internet or World Wide Web. Additionally, the network 112 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104, the support terminal 110, the Websocket Server 108, and the client device 106 communicate via the network using one or more communication platforms and technologies suitable for transporting data and/or communication signals, including any known communication technologies, devices, media, and protocols supportive of data communications, examples of which are described with reference to FIG. 12.

Figure 2:
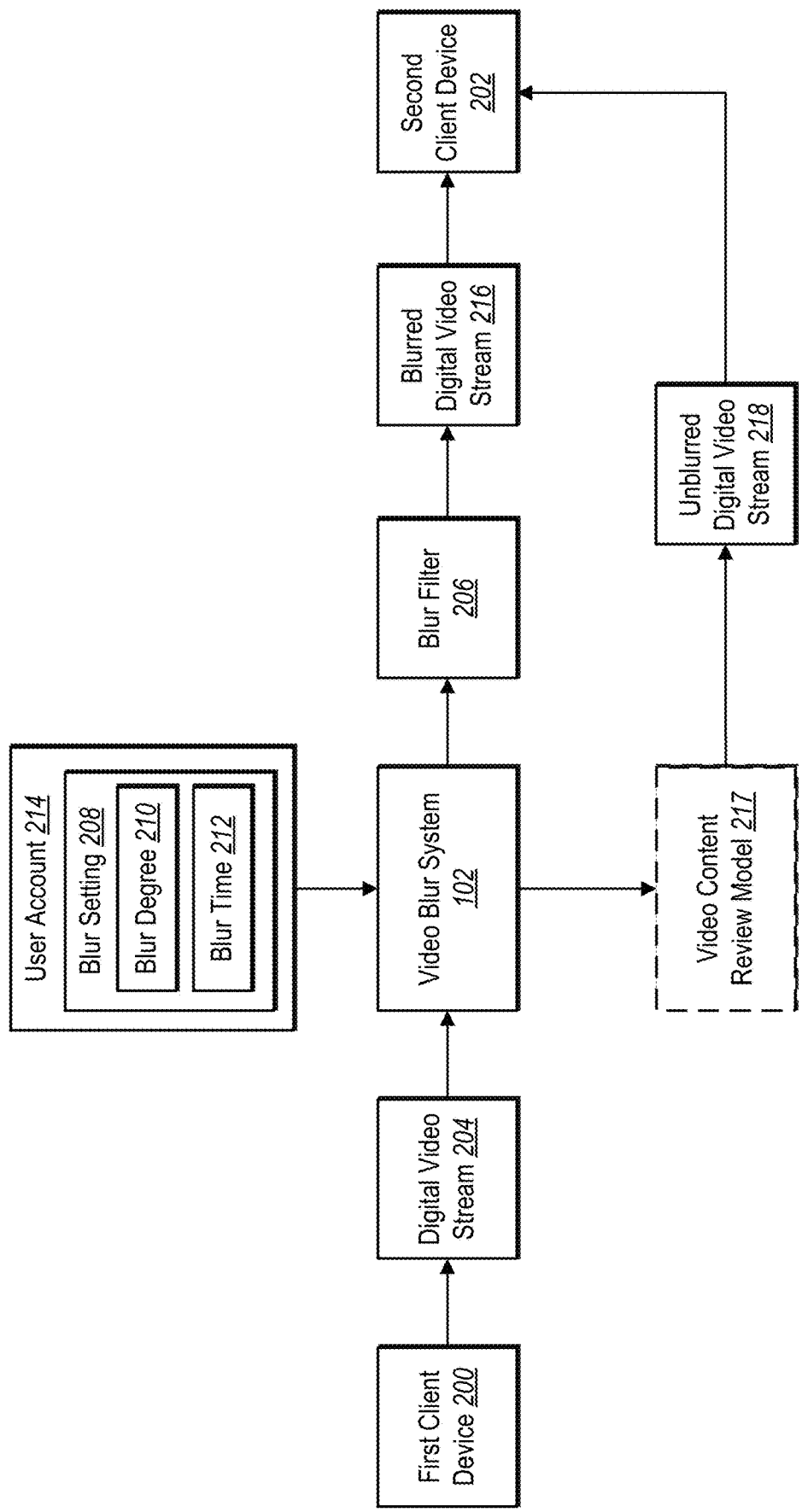
FIG. 2 illustrates an overview diagram of the video blur system blurring a digital video stream in accordance with one or more implementations.

As mentioned, the video blur system 102 improves safety, security, and flexibility in digital video communications by applying blur to digital video streams based on a user's blur settings upon initiating a digital video communication. FIG. 2 illustrates an overview diagram of the video blur system 102 utilizing blur settings associated with a user to generate and apply a blur filter to a digital video stream. In particular, the video blur system 102 utilizes the blur settings to determine how much blur to apply to the digital video stream and how long to apply the blur to the digital video stream.

For example, FIG. 2 illustrates that a first client device 200 engages in a digital video communication with a second client device 202. Specifically, in one or more embodiments, the digital video communication between the first client device 200 and the second client device 202 involves at least the first client device 200 providing digital video to the second client device 202. In additional embodiments, the digital video communication also includes the second client device 202 providing digital video to the first client device 200. Additionally, the digital video communication can include a communication with the aid of another system or device (e.g., the server(s) 104 of FIG. 1) or via a peer-to-peer connection.

In connection with providing digital video from the first client device 200 to the second client device 202 upon initiating a digital video communication, FIG. 2 illustrates that the first client device 200 outputs a digital video stream 204. In one or more embodiments, the digital video stream 204 includes digital video captured by the first client device 200. For example, the first client device 200 can include a digital camera (e.g., a smartphone camera) for capturing video of a user of the first client device 200. Additionally, the first client device 200 can generate the digital video stream 204 for providing a real-time (e.g., "live") video capture of the user of the first client device 200 during the digital video communication for presenting at the second client device 202.

As illustrated in FIG. 2, the video blur system 102 receives the digital video stream 204 from the first client device 200. For example, the video blur system 102 operates a server connected to the first client device 200 and the second client device 202 to receive the digital video stream 204 in connection with facilitating the digital video communication. Alternatively, the video blur system 102 operates at the second client device 202 to receive the digital video stream 204 for the digital video communication.

FIG. 2 illustrates that the video blur system 102 generates a blur filter 206 to apply to the digital video stream 204. In particular, the video blur system 102 can access a blur setting 208 that includes one or more attributes to use in generating the blur filter 206. For instance, the blur setting 208 can include a blur degree 210 indicating a degree of blur to apply to the digital video stream 204 via the blur filter 206. To illustrate, the blur degree 210 can include one or more numerical values indicating how much to distort the digital video stream 204, such as by indicating a pixel blur distance, a direction of blur, or other possible attributes that affect the visual distortion of the blur filter 206. In some embodiments, the blur degree 210 also indicates a blur type selected from a plurality of possible blur types including, but not limited to, a Gaussian blur, a radial blur, a selective blur, or a linear blur. Furthermore, in one or more embodiments, the blur degree 210 can also indicate whether to apply a fading blur or to systematically apply different degrees of blur and the specific degrees of blur to apply.

In one or more embodiments, the blur setting 208 also includes a blur time 212 indicating an amount of time to apply the blur filter 206 during a digital video communication. For example, the blur time 212 can include a numerical value indicating a number of seconds for applying the blur filter 206 to the digital video stream 204 upon initiating a digital video communication. Accordingly, the blur time 212 determines how long before the video blur system 102 removes the blur filter 206 from the digital video stream 204 during a digital video communication. More specifically, the blur time 212 indicates the amount of time the video blur system 102 modifies the digital video stream 204 with the blur filter 206 when initially presenting the digital video stream 204 at the second client device 202. Furthermore, the blur time 212 can optionally indicate times to change the degree of blur in embodiments that fade into clarity.

According to one or more embodiments, the video blur system 102 accesses the blur setting 208 from a user account 214 associated with a user of the second client device 202. To illustrate, the user account 214 can store the blur setting 208 and other information (e.g., video settings, user preferences, personal information) associated with the user of the second client device 202 for establishing digital video communications involving the second client device 202 (or the user of the second client device 202). In some examples, the user account 214 is stored on a server or with a system such as the customer support system 114. Accordingly, the video blur system 102 can access the user account 214 for generating blur filters to apply to digital video streams for presentation at any client device associated with the user.

As mentioned, the video blur system 102 utilizes the blur setting 208 to generate a blur filter 206 with a configuration (e.g., with the blur degree 210) based on the blur setting 208 to apply to the digital video stream 204 for presentation at the second client device 202. For instance, upon receiving the digital video stream 204, the video blur system 102 applies the blur filter 206 to the digital video stream to generate a blurred digital video stream 216. The video blur system 102 then provides the blurred digital video stream 216 for presentation at the second client device 202 upon initializing a digital video communication involving the second client device.

In one or more embodiments, after presenting the blurred digital video stream 216 at the second client device 202, the video blur system 102 also determines when to remove the blur filter 206 based on the blur setting 208. In particular, the video blur system 102 utilizes the blur time 212 to determine when to remove the blur filter 206 based on an amount of time passed from first presenting the blurred digital video stream 216 at the second client device 202. Once the time has passed, the video blur system 102 removes the blur filter 206 and provides an unblurred digital video stream 218 to the second client device 202.

For example, after removing the blur filter 206, the video blur system 102 can pass the digital video stream 204 through to the second client device 202 as the unblurred digital video stream 218. In alternative embodiments, the video blur system 102 can apply one or more modifications to the digital video stream 204 to generate the unblurred digital video stream 218 such as, but not including, compressing the digital video stream 204, modifying a resolution of the digital video stream 204, or cropping the digital video stream 204. In any case, the video blur system 102 removes the blur filter 206 to prevent further blurring of the digital video stream 204 at the second client device 202 after the blur time 212.

As shown in one or more embodiments, the video blur system 102 can also optionally utilize a video content review model 217 to verify whether the digital video stream 204 contains inappropriate content. For example, the video blur system 102 can utilize the video content review model 217 to analyze the content of the digital video stream 204 during the time while the digital video system 102 is blurring the digital video stream 204. If the video blur system 102 determines, based on the analysis of the video content review model 217, that the digital video stream 102 includes inappropriate content, the video blur system 102 can provide a notification to the support terminal 110 to advise the agent that the digital video stream 102 includes inappropriate content. In response to the notification, the agent has the option of canceling the video call or making the blurring of the digital video stream 204 permanent. Alternatively, the upon determining, based on the analysis of the video content review model 217, that the digital video stream 102 includes inappropriate content, the video blur system 102 can terminate the video call. If the video blur system 102 determines, based on the analysis of the video content review model 217, that the digital video stream 102 does not include inappropriate content, the video blur system 102 provides the unblurred digital video stream 218 to the second client device 202 upon the expiration of the blurring of the digital video stream 204 as discussed above.

In one or more embodiments, the video content review model 217 comprises a machine learning model. As used herein, a "machine learning model" refers to a computer representation or algorithm that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

As mentioned, a machine learning model can include a neural network. A neural network can include a model of interconnected artificial neurons (organized in layers) that communicate and learn to approximate complex functions and generate outputs based on a plurality of inputs provided to the model. In addition, a neural network is an algorithm (or set of algorithms) that implements deep learning techniques that utilize a set of algorithms to model high-level abstractions in data. For example, a neural network can include a convolutional neural network, a recurrent neural network, and/or a graph neural network.

In one or more embodiments the video content review model 217 comprises the system described by Fleck et al. in Finding Naked People, In Proceedings of the 4th European Conference on Computer Vision-Volume II (ECCV), pages 593-602, London, UK, 1996, the entire contents of which are hereby incorporated by reference in their entirety. In such embodiments, the video blur system 102 can analyze one or more video frames from the digital video stream 204 utilizing the video content review model 217 to identify areas in the video frames comprising skin. The video blur system 102 can analyze one or more video frames from the digital video stream 204 utilizing an object model of the video content review model 217 to perform object recognition in the areas containing skin to determine whether the video frames include naked or partially naked people.

In further embodiments, the video blur system 102 can utilize the blur filter 206 for one or more additional digital video streams. For example, the video blur system 102 can apply the blur filter 206 to each of a plurality of digital video streams presented at the second client device 202 during a single digital video communication. Thus, the video blur system 102 can apply the blur filter 206 (e.g., by utilizing the attributes of the blur setting 208) to one or more digital video streams upon initiating the digital video communication or to one or more digital video streams added after initiating the digital video communication. Additionally, the video blur system 102 can apply the blur filter 206 to digital video streams during other digital video communications.

Figure 3:
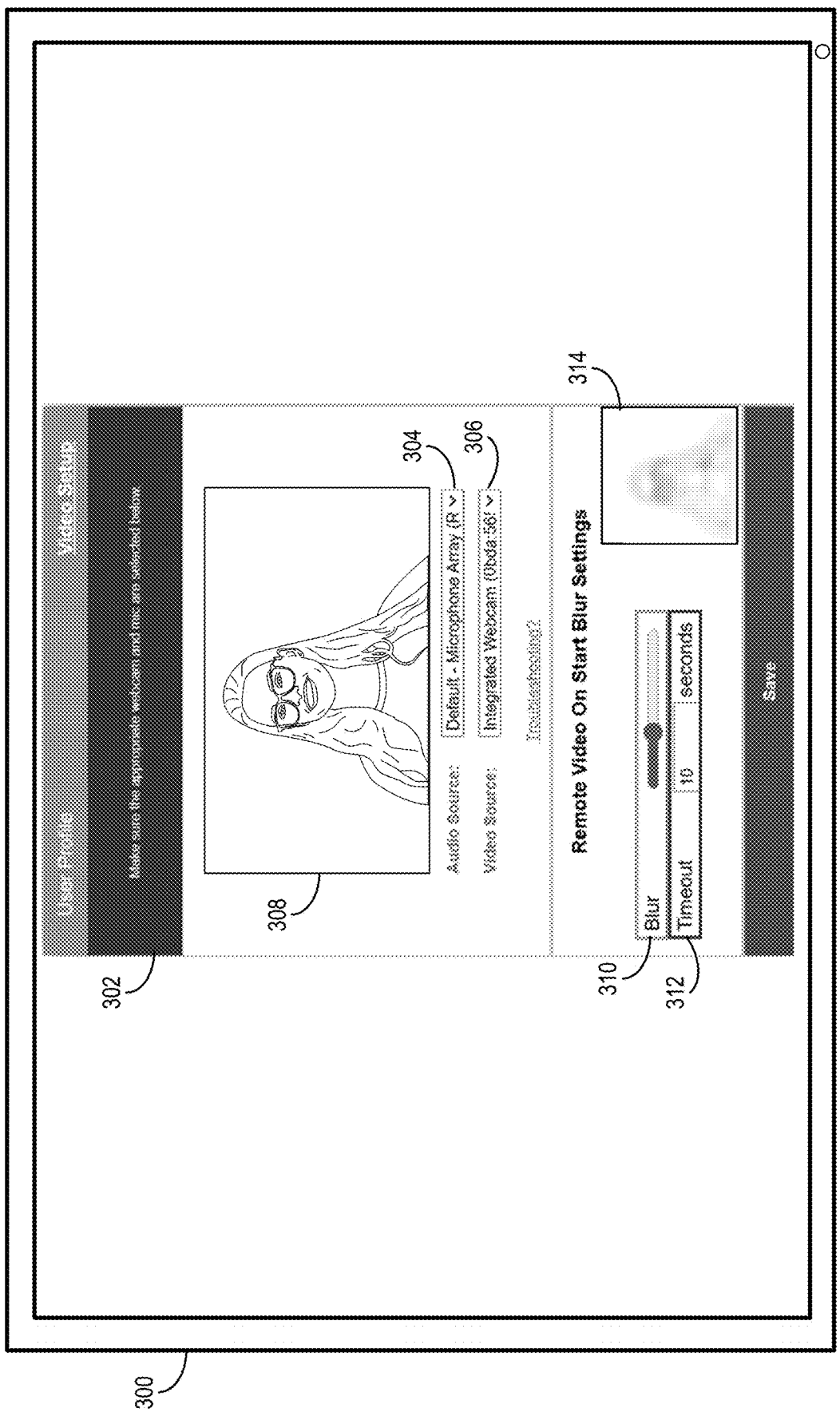
FIG. 3 illustrates a graphical user interface including video settings for a user in accordance with one or more implementations.

As mentioned, the video blur system 102 can generate a blur filter based on a blur setting associated with a user. FIG. 3 illustrates a graphical user interface for establishing video settings for digital video communications involving a user. Specifically, FIG. 3 illustrates that the video blur system 102 provides a plurality of options for establishing a blur setting for generating a blur filter to apply to digital video streams during digital video communications.

In particular, FIG. 3 illustrates a client device 300 that displays a setting interface 302 for setting up digital video communications between the client device 300 and one or more additional client devices. For instance, the client device 300 can include an agent client device associated with an agent. To illustrate, the client device 300 can include a support terminal (e.g., the support terminal 110 of FIG. 1) for providing information or other assistance to one or more users of a customer support system via digital video communications involving two-way digital video communications between the agent and the user(s).

In one or more embodiments, the client device 300 presents one or more video settings associated with providing a digital video stream from the client device 300 to one or more other client devices or for presenting digital video streams from one or more other client devices at the client device 300. For example, the setting interface 302 of FIG. 3 includes an audio source setting 304 for selecting an audio capture device (e.g., a microphone connected to the client device 300) in connection with capturing a digital video stream or a digital audio stream for a digital video communication with another client device. Additionally, the setting interface 302 of FIG. 3 includes a video source setting 306 for selecting a video capture device (e.g., a webcam device connected to the client device 300) in connection with capturing a digital video stream for a digital video communication with another client device.

In one or more additional embodiments, as illustrated in FIG. 3, the client device 300 can display a video preview 308 of an image captured by a selected video capture device. To illustrate, the client device 300 can display a live video capture representing a digital video stream that the client device 300 would provide to another client device during a digital video communication. The client device 300 can update the video preview 308 in real-time as the user moves within a capture frame of the video capture device or in response to movement of the video capture device. Furthermore, in one or more embodiments, the client device 300 displays one or more options for modifying a capture frame or video qualities of the digital video stream captured by the video capture device.

Additionally, as mentioned, the video blur system 102 provides one or more options for blurring a digital video stream. Specifically, as illustrate in FIG. 3, the client device 300 displays a plurality of modifiable attributes associated with establishing a blur setting for generating a blur filter. For instance, the blur setting can include a degree setting 310 to indicate a degree of blur (or "blur degree") modifiable using a slider element displayed within the setting interface 302. In one or more embodiments, the video blur system 102 can detect a position of the slider element and determine a value of the blur degree based on the detected position. To illustrate, a position of the slider element farthest left along a slider track indicates a lowest value for the blur degree (e.g., along a numerical scale), while a position of the slider element farthest right along the slider track indicates a highest value for the blur degree. Alternatively, the degree setting 310 can include a different element such as a numerical value selector, radial buttons, or numerical text entry field.

In one or more embodiments, the blur setting also includes a time setting 312 to indicate an amount of time for applying a blur filter to one or more digital video streams. For example, as illustrated in FIG. 3, the time setting 312 can include a numerical text entry field for manually entering an amount of time (e.g., a number of seconds) to apply blur to a digital video stream. In some embodiments, the video blur system 102 provides a minimum value and a maximum value for the time setting 312. To illustrate, a minimum value can include 0 seconds (e.g., indicating not to apply blur to digital video streams), and a maximum value can include 300 seconds. In other embodiments, the video blur system 102 provides different minimum and maximum values for the time setting 312. Additionally, the video blur system 102 can also provide an option to always apply blur to digital video streams presented at the client device 300. In one or more embodiments, the video blur system 102 also provides an option to have the blur fade over the length of the amount of time specificized by the time setting 312.

As FIG. 3 illustrates, the video blur system 102 can also provide a blur preview 314 including a preview of a blur filter applied to an image or video based on the blur setting. For example, the video blur system 102 can generate a blur filter based on one or more attribute values in the blur setting (e.g., based on a value of a blur degree). The video blur system 102 can also apply the blur filter to a digital image or a digital video to give a user of the client device 300 an idea of how the blur filter will perform on digital video streams during digital video communications. In some embodiments, the video blur system 102 can apply the blur filter to a still image or to a digital video such as video captured by the video capture device of the client device 300 or to a sample digital video. The video blur system 102 can also utilize the blur preview 314 to demonstrate the amount of time indicated in the blur setting. Furthermore, the video blur system 102 can update the blur filter and blur preview 314 in response to detecting changes to the blur setting.

Figure 4:
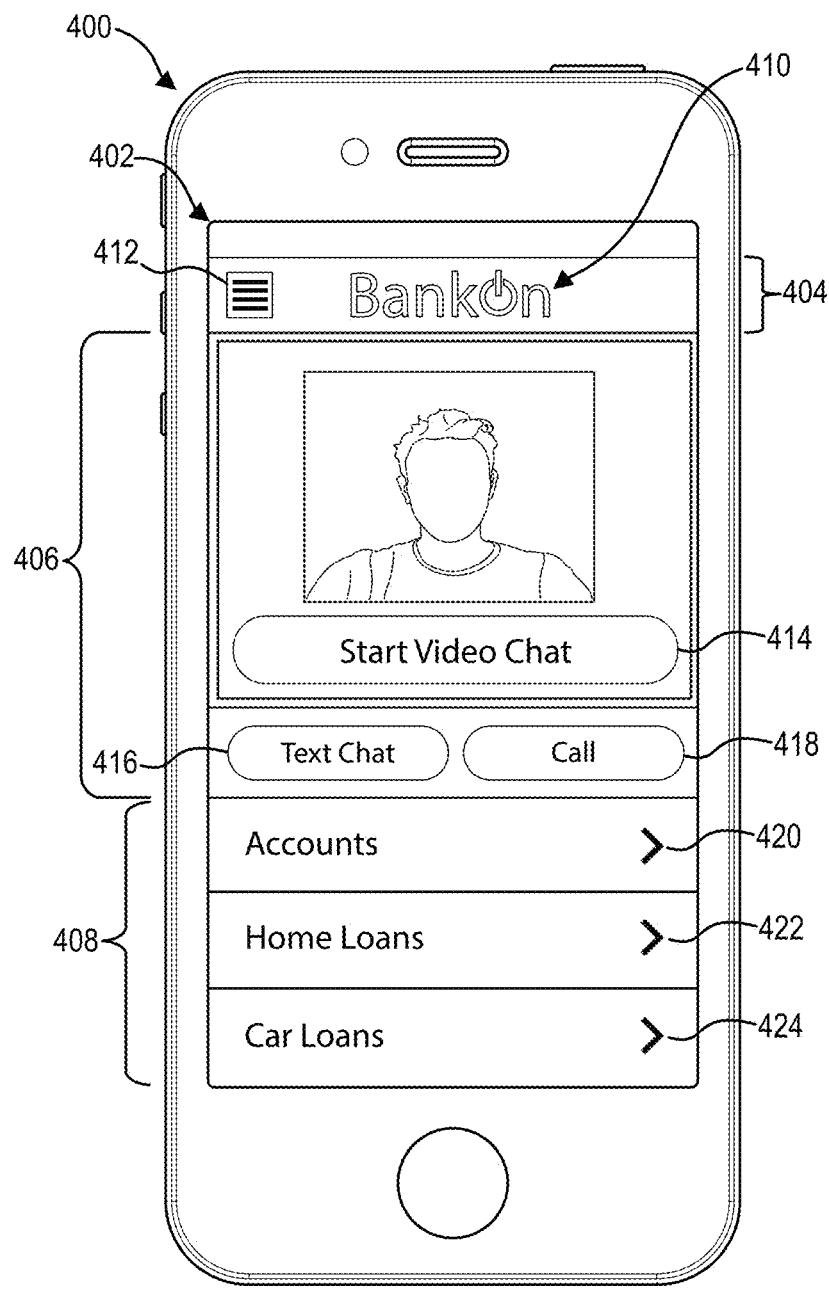
FIG. 4 illustrates a graphical user interface of a user client device for initiating a digital video communication in accordance with one or more implementations.

FIG. 4 illustrates a mobile device 400 displaying an application user interface 402 provided by the customer support system 114 that is operable to allow a user to interact with a mobile application in accordance with one or more embodiments. For example, the mobile application can be associated with a business or other entity that allows a user to interact with the business/entity via the mobile application and/or perform one or more additional actions in connection with the business/entity (e.g., via a peer-to-business interaction). The application user interface 402 includes a heading portion 404, a customer support portion 406, and a navigation portion 408. In alternate embodiments, the application user interface 402 may include any other portions relevant to the mobile application.

The heading portion 404 of the application user interface 402 provides general information and options for the user. FIG. 4 illustrates the heading portion 404 providing a title 410 and a menu 412. The title 410 provides the title of the business but may alternatively provide the name of the mobile application or any other title deemed sufficient for the purposes of the mobile application. The menu 412 provides a drop-down menu with pre-selected options for interacting with the mobile application. For example, the drop-down menu provides the user with an option of logging into a user account or navigating to a home page of the mobile application. In one or more alternative embodiments, the menu 412 may be replaced with links in the heading portion 404 providing the user with similar options.

Customer support portion 406 provides an option to contact a support representative (or other agent associated with the business) to receive assistance. For example, a user who is unfamiliar with a mobile application may need assistance in finding information or performing a desired function. By way of illustration, in the context of a mobile banking application, the user may require help in applying for a loan, finding account balances, performing a check deposit, making a credit card payment, or interacting with the mobile application in another way.

As illustrated in FIG. 4, the customer support portion 406 includes multiple selectable buttons the user can select to contact a support representative. For example, the customer support portion 406 of FIG. 4 includes a video chat button 414, a text chat button 416, and a phone call button 418, which the mobile application may use to initiate a digital video communication, a text chat, or a phone call respectively. In response to a selection, the mobile device 400 sends a request to initiate a communications session of the type associated with the button. For example, by selecting the video chat button 414, the mobile device 400 sends a request to begin a digital video communication with a support representative.

Alternatively, the customer support portion 406 may include other selectable buttons to contact the support representative, such as an option to e-mail or send a voice-recorded message. It will also be appreciated that any number of selectable buttons may be present in the customer support portion 406 in any combination. To illustrate, the customer support portion 406 may include selectable buttons for digital video communication, text chat, phone call, and email message, or the customer support portion 406 may only include the video chat button 414.

The navigation portion 408 presents the user with quick navigational options. For example, the navigation portion 408 of FIG. 4 presents options to navigate to a page comprising information on accounts 420, information on home loans 422, or information on car loans 424. In one or more embodiments, other options deemed useful to the user may also be present.

Figure 5:
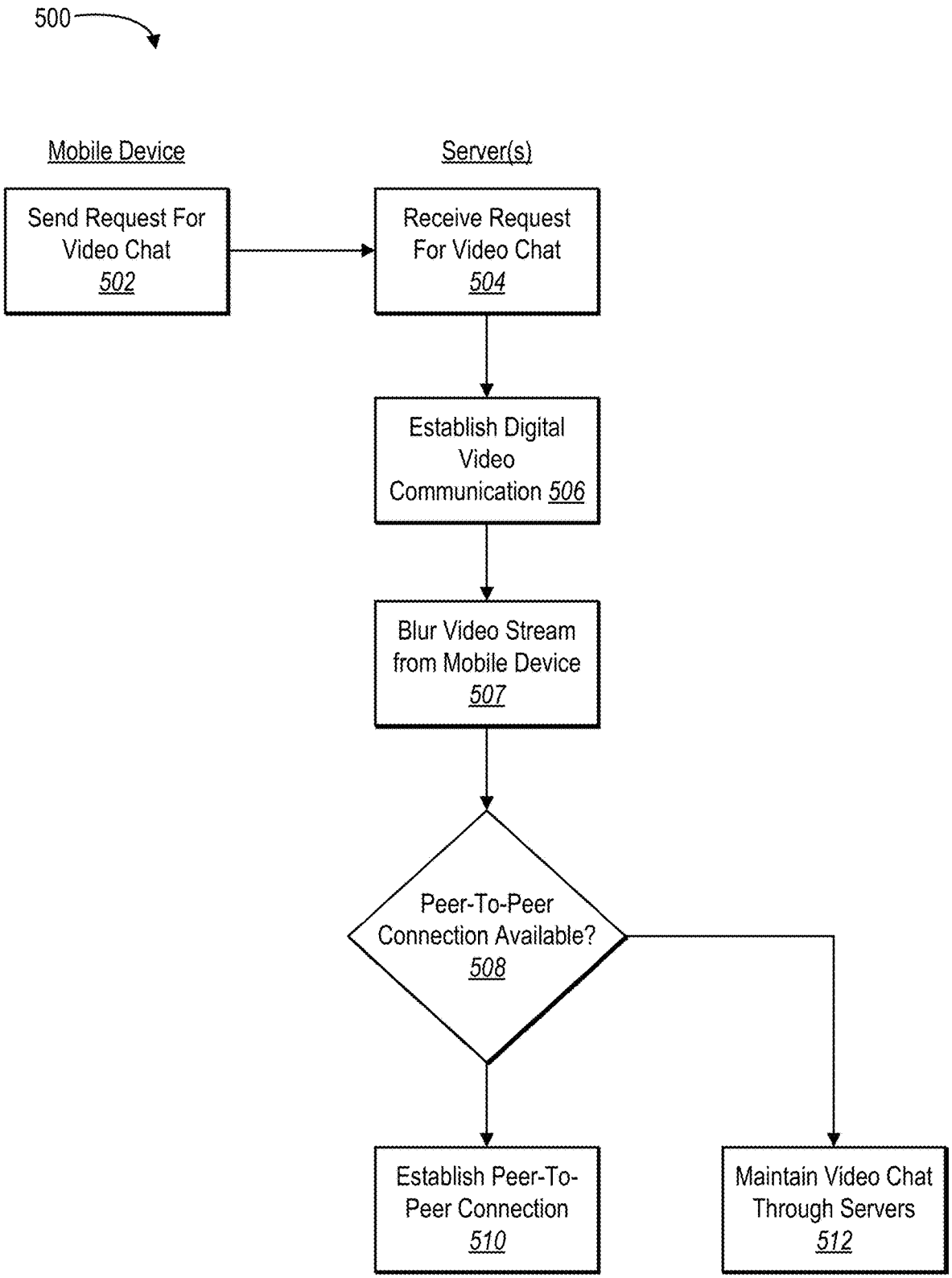
FIG. 5 illustrates a flowchart of a series of acts in a method of initiating a digital video communication between a mobile device and an additional device in accordance with one or more embodiments.

In one or more embodiments, the customer support system 114 establishes a digital video communication between a user client device (e.g., a mobile device) and an agent client device (e.g., a support terminal). FIG. 5 illustrates a flowchart of a series of acts 500 performed by the customer support system 114 of initiating a digital video communication between a mobile device and a support terminal in accordance with one or more embodiments. Though FIG. 5 illustrates the series of acts 500 implemented in the context of a user using a mobile device, one or more embodiments involve the user utilizing another type of client device (e.g., desktop, laptop, tablet, etc.). In one or more embodiments, the series of acts 500 is performed in a hardware environment that includes the system environment 100. The series of acts 500 is intended to be illustrative of one or more methods in accordance with the present disclosure and is not intended to limit potential embodiments. Alternative embodiments can include additional, fewer, or different steps than those articulated in FIG. 5.

As illustrated in FIG. 5, the series of acts 500 includes an act 502 of sending, from a mobile device, a request to initiate a digital video communication. The request can initially be processed by a series of one or more servers, such as the server(s) 104 of FIG. 1. As discussed above, the server(s) 104 may contain a load balance server, a signaling server, and a STUN/TURN server. Alternatively, the request may be sent through a single server that performs the same functionality as the combination of servers. In particular, the act 502 includes sending a request from the mobile device to initiate a digital video communication between the mobile device and a support terminal.

Moreover, as illustrated in FIG. 5, the series of acts 500 also includes an act 504 of receiving the request to initiate a digital video communication. Furthermore, FIG. 5 illustrates that the series of acts 500 also includes an act 506 of establishing a digital video communication between the mobile device and a support terminal. In particular, the act 506 comprises establishing a first connection between the mobile device and the support terminal and conducting a digital video communication transmitted across the first connection. In particular, the first connection can comprise a connection established through the server(s) 104.

Once the digital video communication is established, or as part of establishing the digital video communication, the video blur system 102 blurs the digital video stream from the mobile device in accordance with the blur settings as described above. Once the video blur system 102 has completed the blurring of the digital video stream from the mobile device and begins transmission of the unblurred digital video stream as described above, the customer support system 114 determines whether a peer-to-peer connection is available.

In particular, and as shown in FIG. 5, the series of acts 500 also includes the act 508 of determining whether a peer-to-peer connection is available between the mobile device and the support terminal. In response to determining that a peer-to-peer connection is available, the series of acts 500 proceeds to the act 510 of establishing a peer-to-peer connection between the mobile device and the support terminal. In particular, the act 510 switches the digital video communication from being conducted via a connection through the server(s) 104 to a peer-to-peer connection (i.e., the peer-to-peer connection 120). In one or more embodiments, the act 510 may include severing the connection through server(s) 104 after the peer-to-peer connection has been established between the mobile device and the support terminal. One will appreciate in light of the disclosure herein that the use of a peer-to-peer connection to conduct the digital video communication can reduce system resources needed for the digital video communication, provide greater flexibility, and in some cases allow for quicker communication between the mobile device and the support terminal.

Alternatively, in response to determining that a peer-to-peer connection is not available, the series of acts 500 proceeds to the act 512 of maintaining the digital video communication through the server(s) 104. In one or more embodiments, the digital video communication may be maintained through the server(s) 104 whether or not a peer-to-peer connection is available.

Figure 6:
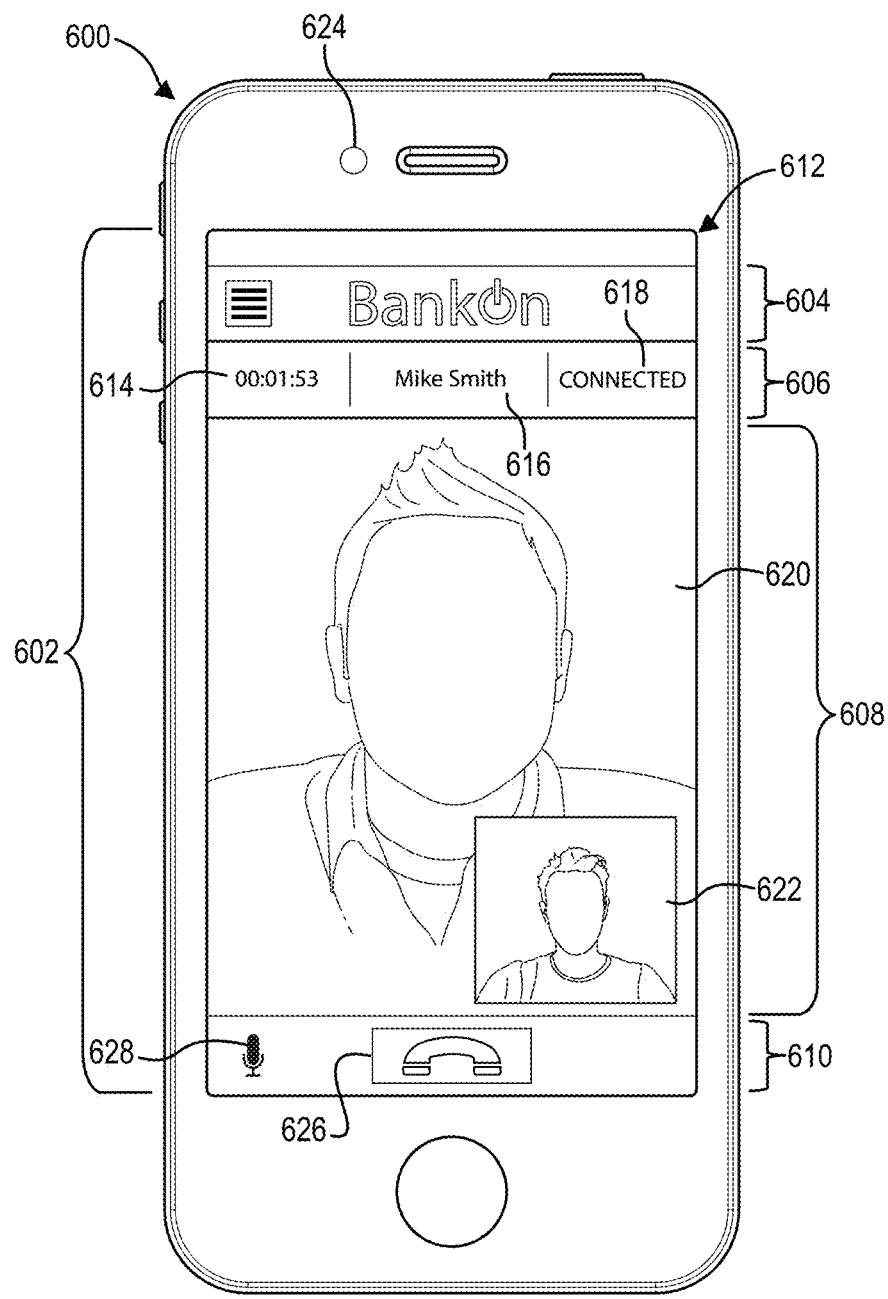
FIG. 6 illustrates a graphical user interface of a user client device presenting a digital video communication in accordance with one or more embodiments.

FIG. 6 illustrates a mobile device 600 displaying a video chat interface 602 after a digital video communication has been established between a mobile device and a support terminal. The video chat interface 602 includes a heading portion 604, a session information portion 606, a video chat display portion 608, and a session control portion 610. As illustrated in FIG. 6, the video chat interface 602 utilizes the entirety of the mobile device display screen 612. In one or more alternative embodiments, the video chat interface 602 utilizes less than the entirety of the mobile device display screen 612 in response to receiving a display element trigger from a support terminal after the digital video communication is established to present one or more display elements with the digital video communication.

As illustrated in FIG. 6, the session information portion 606 of the video chat interface 602 displays information regarding the digital video communication conducted between the mobile device and the support terminal. In particular, the session information portion 606 includes a time-keeping portion 614, a support representative identity portion 616, and a connection status portion 618. The time-keeping portion 614 displays the duration of the current digital video communication. The support representative identity portion 616 displays the name of the support representative engaging in the digital video communication. The connection status portion 618 displays the status of the connection between the mobile device and the support terminal. In one or more embodiments, the connection status portion 618 can indicate whether the digital video communication is being conducted via a peer-to-peer connection or not.

As illustrated in FIG. 6, the video chat display portion 608 includes a support representative display 620 and a mobile device user display 622. In particular, the support representative display 620 displays video content captured by the support terminal. The mobile device user display 622 displays video content captured by a camera 624 of the mobile device 600. As shown in FIG. 6, mobile device user display 622 is displayed in a lower right corner of the video chat display portion 608. Alternatively, the mobile device user display 622 may be displayed in another location of the video chat display portion 608. In one or more embodiments, the mobile device user display 622 may be relocated to another location in response to detecting a user interaction. For example, a user may select and, with a dragging motion, relocate the mobile device user display 622 to another location.

As further illustrated in FIG. 6, the session control portion 610 of the video chat interface 602 includes a session end option 626 and a microphone mute option 628. Alternatively, one or more embodiments may include other options, such as a record option to record the audio content, visual content, or both from the digital video communication.

In establishing a digital video communication between a client device and a support terminal, a customer support system (e.g., via the support terminal or a server) can send instructions to the client device to display the digital video communication concurrently with a display element. For example, a customer support system can send a display element trigger to the client device that causes the client device to partition its display into multiple panes and to display the digital video communication in one pane and the corresponding display element in another pane. In some embodiments, a customer support system (e.g., via the support terminal or a server) sends a separate display trigger, in addition to the display element trigger, to cause the client device to partition its display. To illustrate, in some embodiments, a display element trigger causes the device to retrieve, render, or otherwise obtain a corresponding display element and the display trigger separately causes the client device to partition its display so as to display the display element concurrently with the digital video communication.

In one or more embodiments, a display element includes a visualization of data and/or interactive elements displayable on a user interface. In particular, a display element includes a visual means for viewing information or performing a task displayable on a user interface. For example, a display element can include a signature pad, a video, a Tillable digital form, a selectable option for accepting terms, a document, or an informational slide. A display element can further include an interactive button enabling a user to submit that a corresponding task has been completed. Accordingly, a client device can display a digital video communication with additional interactive display elements for performing one or more operations within a graphical user interface of a client application.

Figure 7A:
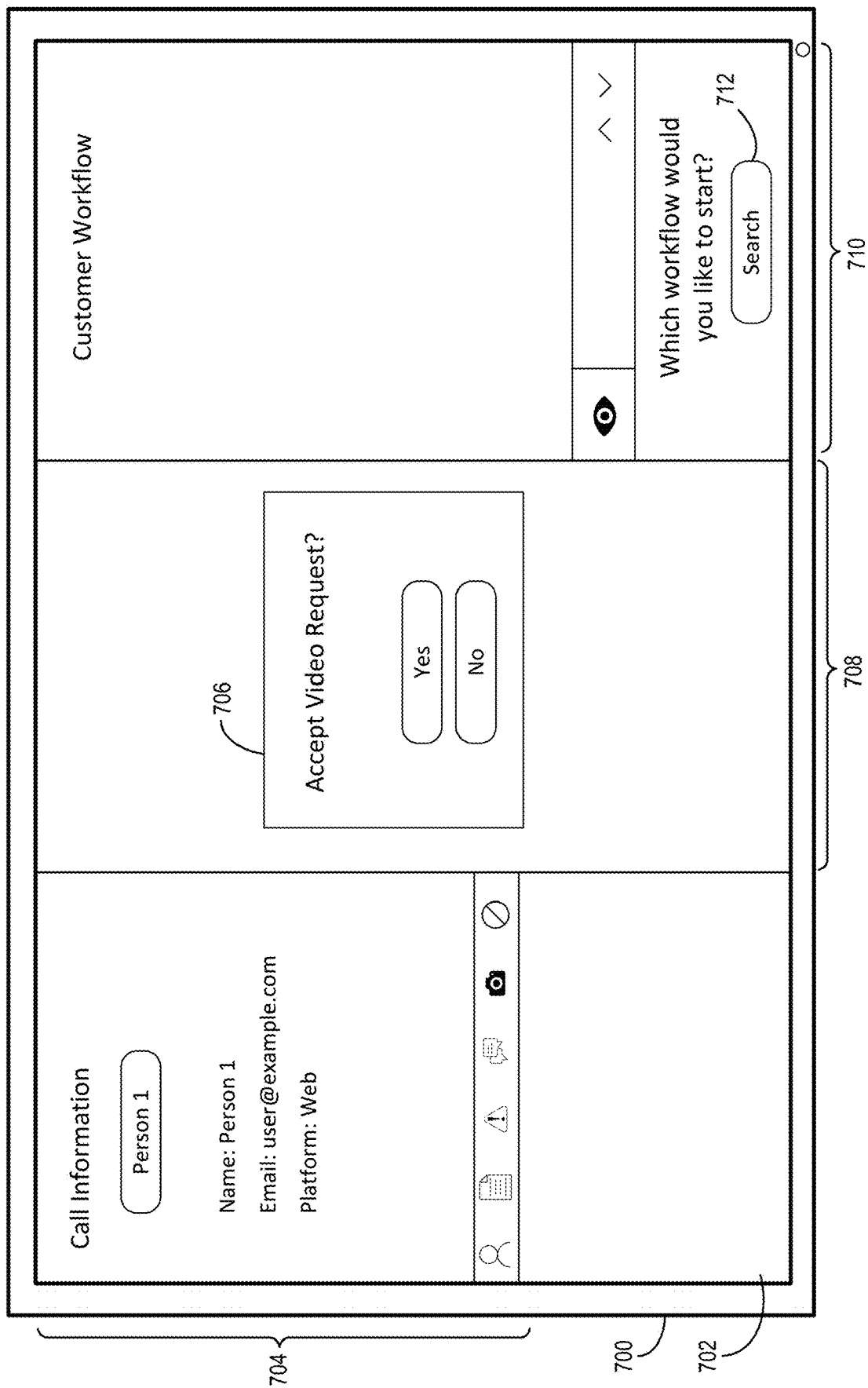
FIGS. 7A-7C illustrate graphical user interfaces of an agent client device for initiating a video communication based on blur settings for an agent user in accordance with one or more implementations.
Figure 7B:
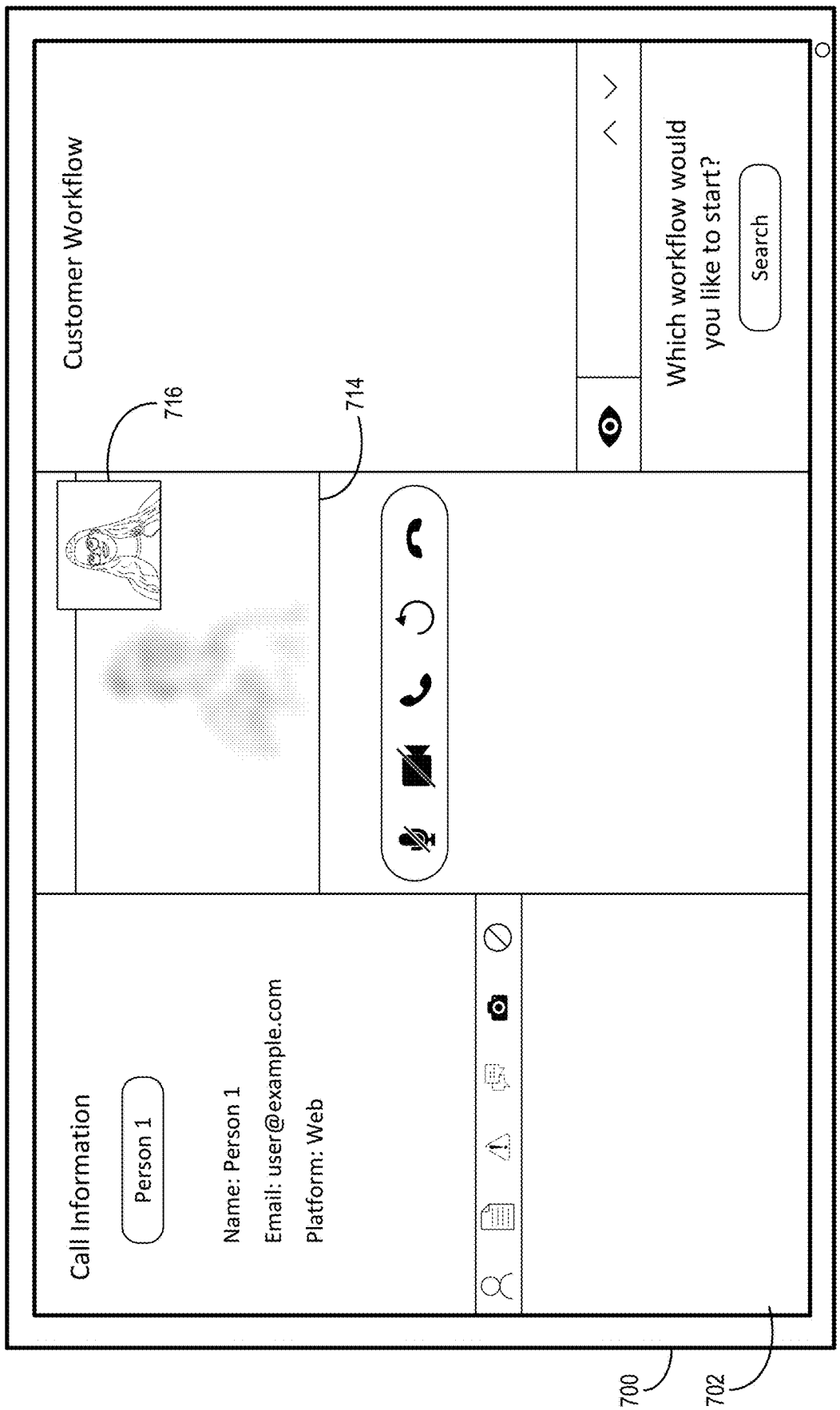
Figure 7C:
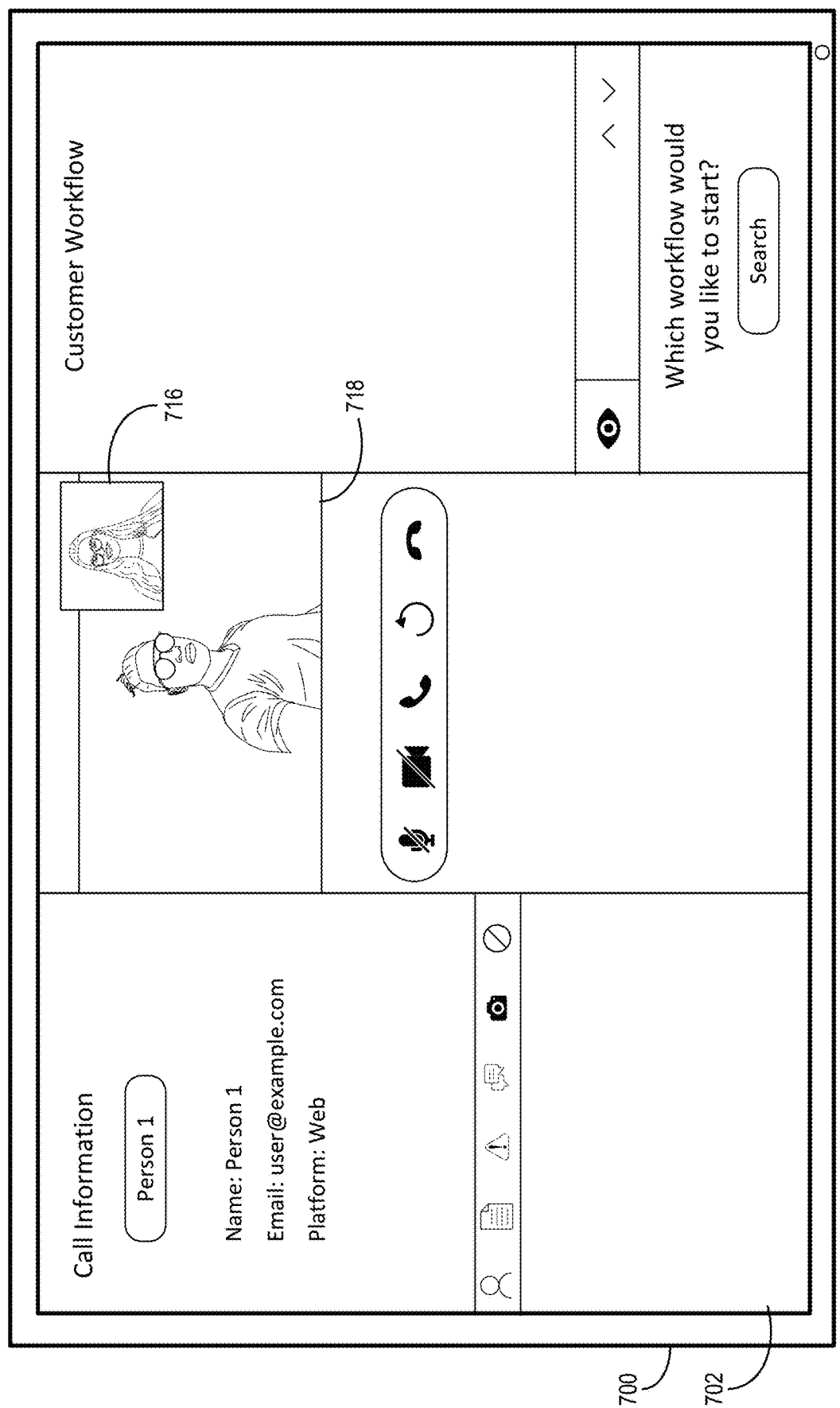

As mentioned, the video blur system 102 can generate and apply a blur filter to one or more digital video streams in a digital video communication for presentation at a client device of a user. FIGS. 7A-7C illustrate graphical user interfaces for conducting a digital video communication with one or more users and performing operations to assist the one or more users with one or more operations. In particular, FIGS. 7A-7C illustrate a sequence of graphical user interfaces in which the video blur system 102 initiates a digital video communication and presents a digital video stream from a user according to a blur filter based on a blur setting for a user (e.g., an agent).

FIG. 7A illustrates a client device 700 displaying a graphical user interface 702 associated with a client application. In one or more embodiments, the client device 700 includes an agent client device associated with an agent of an entity. Additionally, the client application can include a software application for communicating with users associated with the entity (e.g., customers or potential customers) and providing assistance to the users. In particular, the client application can include tools for communicating with users via various digital communications media and/or for performing operations to assist the users while communicating with the users.

In one or more embodiments, the client device 700 receives a request to initiate a digital video communication between the user of the client device 700 and a user of another client device. In response to the request, the client device 700 can obtain call information and display the call information within an information portion 704 of the graphical user interface 702. For example, the client device 700 can obtain a name, a username, contact information (e.g., email address), and a platform associated with the request (e.g., mobile application, web interface). As shown in FIG. 7A, the client device 700 can display the call information for a user of the other client device that requested the digital video communication.

In addition to displaying the call information within the information portion 704, the client device 700 can display a prompt 706 indicating options for the user to accept or reject a request to initiate a digital video communication. Specifically, in response to receiving the request, the client device 700 can display the prompt 706 within a video portion 708 of the graphical user interface 702. As illustrated in more detail in FIG. 7B and FIG. 7C, the client device 700 can display a digital video stream as part of a digital video communication within the video portion 708 after detecting a selection to accept the request.

Additionally, FIG. 7A illustrates that the client device 700 displays a workflow portion 710 including information and/or options associated with performing one of a plurality of available workflows. In one or more embodiments, the workflow portion 710 includes a workflow search 712 to search for a specific workflow in connection with a digital video communication. For example, after (or otherwise in connection with) accepting a request to initiate a digital video communication, the user can also select a workflow to initiate. The client device 700 can then present display elements corresponding to the selected workflow within the workflow portion 710. Accordingly, the client device 700 can provide tools for performing various operations associated with the selected workflow to provide information and/or assistance to requesting users involved in a digital video communication with the user of the client device 700.

FIG. 7B illustrates that the client device 700 presents digital video streams associated with a digital video communication initiated between two users. Specifically, the client device 700 receives a digital video stream captured at a client device of a user requesting the digital video communication. In one or more embodiments, the client device 700 receives the digital video stream from a server including a customer support system or from the client device of the requesting user (e.g., in a peer-to-peer connection). The client device 700 can then display the digital video stream within the video portion 708 of the graphical user interface 702.

As mentioned previously, the video blur system 102 blurs digital video streams presented at a client device upon first presenting the digital video streams at the client device. As illustrated in FIG. 7B, the video blur system 102 generates a blur filter based on a blur setting associated with the user of the client device 700. The video blur system 102 then applies the blur filter to the digital video stream to present a blurred digital video stream 714 within the video portion 708 according to a degree of blur and an amount of time indicated in the blur setting.

By presenting the blurred digital video stream 714 upon initiating the digital video communication, the video blur system 102 can protect the user of the client device 700 from seeing inappropriate or offensive content in the digital video stream. Specifically, the user can quickly determine whether the blurred digital video stream 714 includes inappropriate/offensive content without seeing specific details. Furthermore, because the blur filter is based on one or more user-selected values of attributes in a blur setting, the degree of blur (e.g., the amount of detail shown) in the blurred digital video stream is customizable to the user's preferences. In additional embodiments, the video blur system 102 can utilize a default blur setting if the user has not explicitly defined a blur setting. Additionally, some users may prefer not to blur digital video streams presented at their respective client devices such that the video blur system 102 does not apply blur filters to digital video streams.

In one or more embodiments, the client device 700 also provides an additional digital video stream 716 including digital video of the user captured by the client device 700 (or by a video capture device associated with the client device 700). For instance, as illustrated in FIG. 7B, the client device 700 can display the additional digital video stream 716 as an overlay on top of a portion of the blurred digital video stream 714. Alternatively, the client device 700 can display the additional digital video stream 716 in another area of the graphical user interface 702 such as below, above, or to the side of the blurred digital video stream 714. As illustrated in FIG. 7B, the video blur system 102 does not apply the blur filter to the additional digital video stream 716.

Additionally, in one or more embodiments, the video blur system 102 applies a blur filter to digital video streams presented at a client device of a user based on a user's blur setting. Accordingly, the video blur system 102 does not apply the blur filter to digital video streams for presenting at client devices that are not associated with a blur setting. To illustrate, a user requesting to initiate the digital video communication (i.e., the user associated with the blurred digital video stream 714 in FIG. 7B) may not have a blur setting. The video blur system 102 thus blurs the digital video stream from the user at the recipient's client device (e.g., client device 700), but not at the client device of the requesting user (e.g., client device 600 in FIG. 6). Furthermore, the video blur system 102 may also not provide any indication to the requesting user's client device that the video blur system 102 blurred the digital video stream at the recipient's client device. The video blur system 102 can thus protect the privacy and the safety of the recipient user.

In connection with presenting a digital video stream with a blur filter at a client device based on a blur setting of a user of the client device, the video blur system 102 can also remove the blur filter based on the blur setting. Specifically, as illustrated in FIG. 7C, once an amount of time indicated in the blur setting has passed, the video blur system 102 can remove the blur filter and present an unblurred digital video stream 718 at the client device 700. The unblurred digital video stream 718 replaces the blurred digital video stream 714 and allows the user of the client device 700 to see the unblurred content of the digital video stream from the client device of the requesting user. Thus, if the duration of the digital video communication is longer than the amount of time specified in the user's blur setting, the client device 700 displays the unblurred digital video stream 718 for the remainder of the digital video communication. If the digital video communication ends before the amount of time in the blur setting, the digital video communication ends without the client device 700 displaying the unblurred digital video stream 718.

Figure 8:
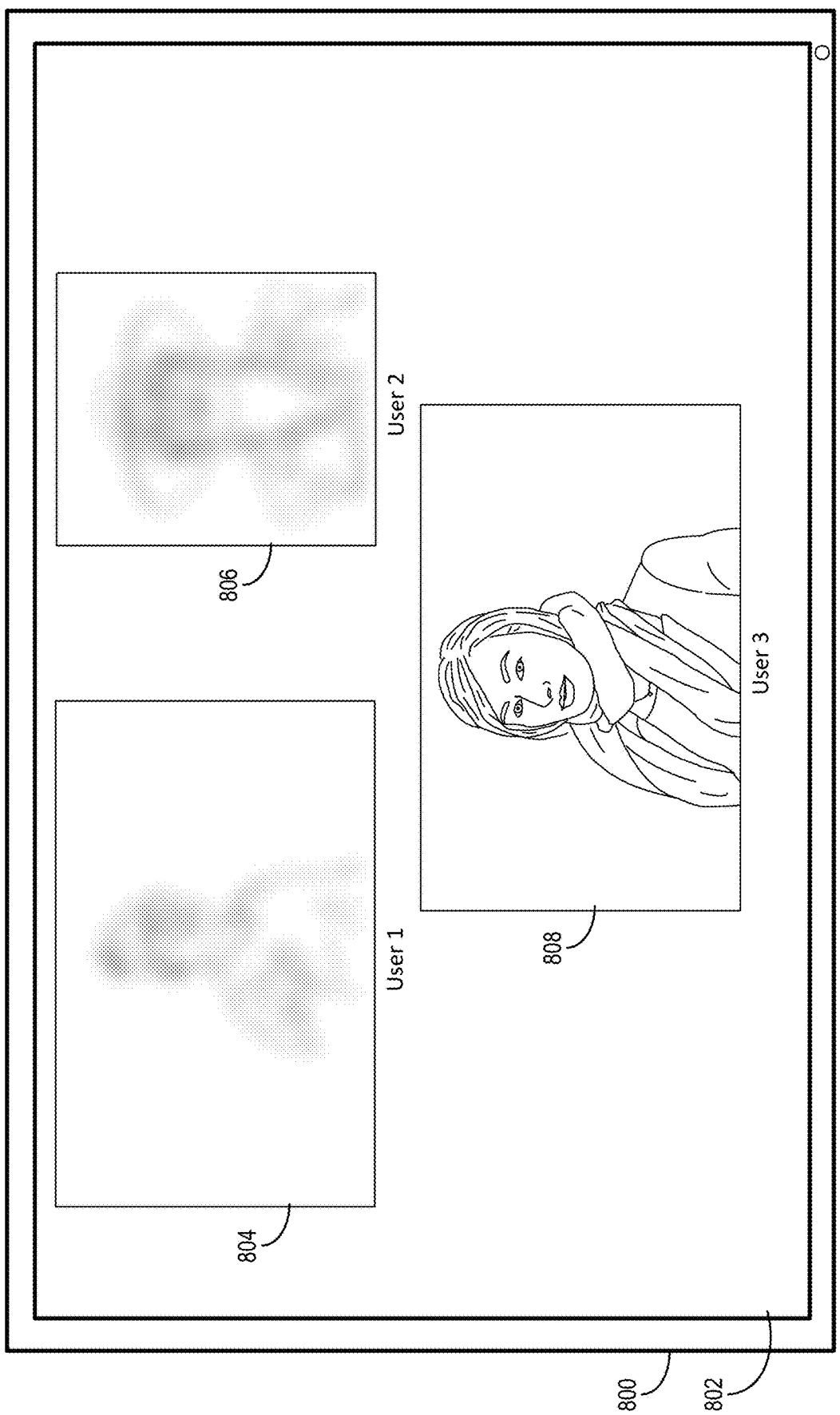
FIG. 8 illustrates a graphical user interface of a client device for initiating a digital video communication with blurred video for a plurality of digital video streams in accordance with one or more implementations.

In one or more additional embodiments, the video blur system 102 applies a blur filter to a plurality of digital video streams presented at a client device. FIG. 8 illustrates a client device 800 displaying a graphical user interface 802 including a plurality of digital video streams associated with a digital video communication involving a plurality of users. In particular, the digital video communication can involve more than two users (e.g., a video conference for a plurality of users). To illustrate, the digital video communication can include a video conference for a plurality of employees of a business, a plurality of students (and a teacher) in a classroom, or any other group of users.

As illustrated in FIG. 8, the video blur system 102 can apply a blur filter to a plurality of digital video streams received by the client device 800 and presented at the client device 800 in connection with the digital video communication. For instance, the video blur system 102 can receive a first digital video stream 804 and a second digital video stream 806 from a first additional client device and a second additional client device, respectively. The video blur system 102 can also determine that a user of the client device 800 has a blur setting indicating to blur digital video streams received as part of digital video communications involving the user of the client device 800. The video blur system 102 can then blur the first digital video stream 804 and the second digital video stream 806 upon initiating the digital video communication and for the amount of time indicated in the blur setting. FIG. 8 also illustrates a third digital video stream 808 (unblurred) corresponding to the user of the client device 800 (e.g., captured at the client device 800).

In one or more embodiments, the video blur system 102 can also apply a blur filter to new digital video streams added after initiating the digital video communication. To illustrate, if a user of the first client device associated with the first digital video stream 804 and the user of the client device 800 initiate the digital video communication by themselves, the video blur system 102 can apply the blur filter to the first digital video stream 804. If the user of the second client device then joins the digital video communication at a later time, the video blur system 102 can apply the blur filter separately to the second digital video stream 806 at the time the second digital video stream 806 is added to the graphical user interface 802.

Furthermore, by applying the blur filter to each individual digital video stream, the amount of time the blur filter is applied to each digital video stream depends on the time the client device 800 first presents each digital video stream. For example, in a scenario in which the second digital video stream 806 is added to the digital video communication after the first digital video stream 804, the video blur system 102 removes the blur filter from the second digital video stream 806 after removing the blur filter from the first digital video stream 804.

According to one or more additional embodiments, the video blur system 102 can also apply different blur filters to different digital video streams. Specifically, the video blur system 102 can provide a setting to indicate one or more trusted users (e.g., white-listed users, verified users, or users with a specific set of identifying information). In the case of trusted users, the video blur system 102 can apply a blur filter for a shorter amount of time or apply no blur filter at all. Additionally, the video blur system 102 can provide a setting to indicate to apply a blur filter for a longer amount of time for specific users (e.g., for unlisted users or users with less identifying information). The video blur system 102 can thus provide users with customization options to customize the blur filter for different scenarios.

Figure 9:
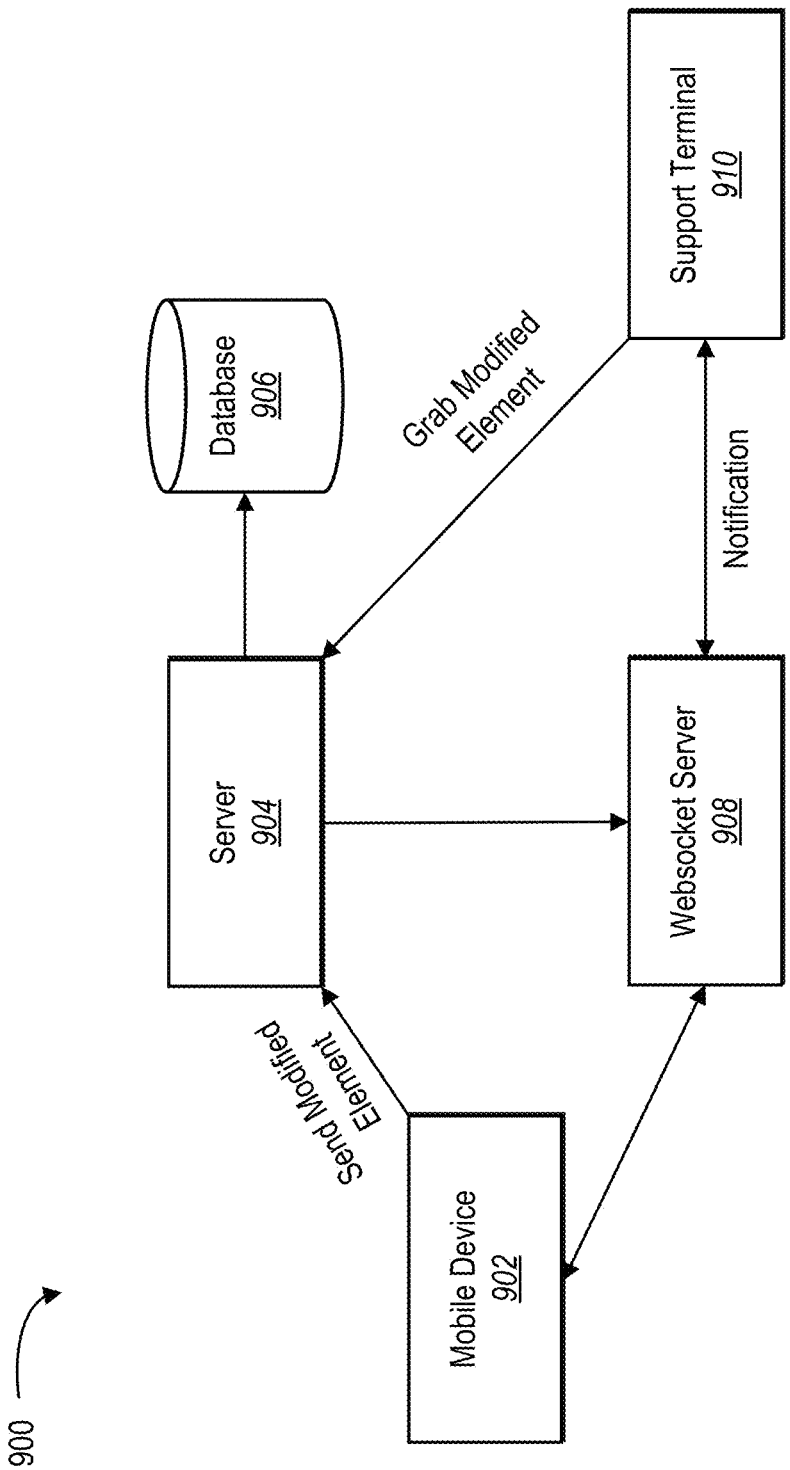
FIG. 9 illustrates a schematic diagram of a system for sending modified display elements in accordance with one or more embodiments.

As mentioned previously, the video blur system 102 can provide blurred digital video streams in digital video communications along with display elements for performing various workflows associated with the digital video communications. Accordingly, in connection with initiating digital video communications, some embodiments of the video blur system 102 (or a customer support system including the video blur system 102) can provide the ability to modify display elements across a plurality of client devices in one or more workflows. FIG. 9 illustrates an example implementation of a system 900 for sending a modified display element to a support terminal. In one or more embodiments, the system 900 comprises components used in the system environment 100 of FIG. 1, and the system environment 100 can perform the same operations as the system 900. In other words, the customer support system 114 of FIG. 1 operates within the system environment 100 to implement the system 900. As illustrated in FIG. 9, the system 900 comprises a mobile device 902, a server 904, a database repository 906, a Web Socket server 908, and a support terminal 910.

The system 900 establishes a connection between the mobile device 902 and the database repository 906 through the server 904. In one or more embodiments, the connection is a third connection different from a first connection used to establish a digital video communication between the mobile device 902 and the supporter terminal 910 and different from a second connection used to enable the support terminal 910 to push display elements to the mobile device 902. The server 904 enables the mobile device 902 to securely transmit a modified display element to the database repository 906. As illustrated in FIG. 9, the server 904 is a single server. Alternatively, the third connection may be made through a series of servers. Because the system 900 can provide the display elements and modified display elements via one or more connections separate from a connection used to establish the digital video communication, the system 900 can securely and separately maintain the information from the digital video communication and display elements.

After receiving a modified display element, in one or more embodiments, the support terminal 910 may grab the modified element from the server 904 or by otherwise communicating with the server 904, as illustrated in FIG. 9. In one or more alternative embodiments, the server 904 forwards the modified display element to the database repository 906 and sends a notification to the support terminal 910 through the WebSocket server 908. In one or more alternative embodiments, the notification may be sent to the support terminal 910 directly from the mobile device 902. The notification indicates that the database repository 906 has received the modified display element and provides a location of the element within the database repository 906 so the support terminal 910 may grab the modified element. Additionally, or alternatively, the notification may include a link to the location of the modified display element, enabling the support terminal 910 to quickly acquire the modified element.

The database repository 906 may comprise a service that allows for the deposit and retrieval of electronic files. For example, the database repository 906 may be an electronic drop box, email service, or other cloud-based technology that allows electronic file sharing.

Though not explicitly illustrated in FIG. 9, one or more embodiments use the system 900 to provide notifications and display elements to the mobile device 902. For example, the server 904 can send a notification of a task to the mobile device 902 (e.g., through the Web Socket server 908). If the user indicates acceptance of the task indicated by the notification, the server 904 can then retrieve the display element that corresponds to the task from the database repository 906 and provide the display element to the mobile device 902.

As shown by FIG. 9, the system 900 can utilize cloud hosting (i.e., the database can comprise one or more cloud based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
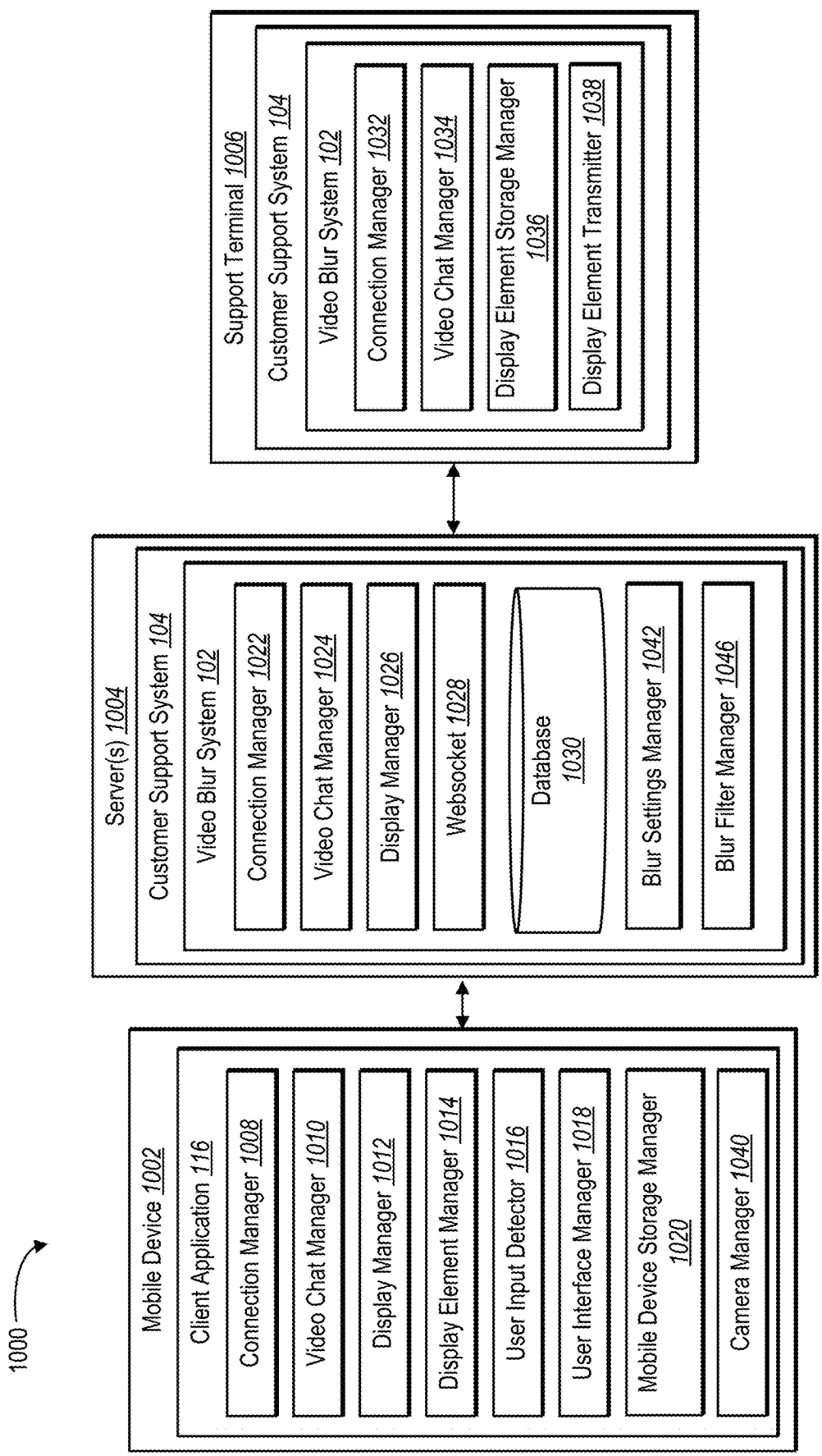
FIG. 10 illustrates a diagram including the video blur system of FIG. 1 in accordance with one or more implementations.

Turning now to FIG. 10, additional detail will be provided regarding components and capabilities of one embodiment of the present invention comprising the system environment 100 as well as the system 900. In particular, FIG. 10 illustrates an embodiment of an exemplary system 1000. As shown, the system 1000 may include, but is not limited to, a mobile device 1002, a server(s) 1004, and a support terminal 1006. Moreover, as shown, the mobile device 1002 includes, but is not limited to, a connection manager 1008, a video chat manager 1010, a display manager 1012, a display element manager 1014, a user input detector 1016, a user interface manager 1018, a mobile device storage manager 1020, and a camera manager 1040. Additionally, as shown in FIG. 10, the server(s) 1004 includes the video blur system 102 (e.g., in the customer support system 114), which further includes, but is not limited to, a connection manager 1022, a video chat manager 1024, a display manager 1026, a WebSocket 1028, a database 1030, a blur settings manager 1042, and a blur filter manager 1046. Though not shown in FIG. 10, it will be appreciated that the support terminal 1006 can include the blur settings manager 1042, the blur filter manager 1046, and/or one or more other components of the video blur system 102), as discussed above. Furthermore, as shown in FIG. 10, the support terminal 1006 includes, but is not limited to, a connection manager 1032, a video chat manager 1034, a display element storage manager 1036, and a display element transmitter 1038.

As just mentioned, and as illustrated in FIG. 10, the mobile device 1002 includes the connection manager 1008. The connection manager 1008 searches for, detects, identifies, accepts, establishes, monitors, and maintains various types of connections. In particular, the connection manager 1008 establishes and maintains one or more connections between the mobile device 1002 and another device, such as the support terminal 1006. For example, when establishing a digital video communication between the mobile device 1002 and the support terminal 1006, the connection manager 1008 will establish and maintain a peer-to-peer connection through the duration of a digital video communication.

As mentioned, and as illustrated in FIG. 10, the mobile device 1002 also includes the video chat manager 1010. The video chat manager 1010 initiates, provides for display, and maintains a digital video communication between the mobile device 1002 and another device, such as the support terminal 1006. In particular, the video chat manager 1010 operates in conjunction with the connection manager 1008 to establish and maintain a digital video communication between the mobile device 1002 and another device, such as the support terminal 1006.

Additionally, the video chat manager 1010 operates in conjunction with a number of user input/output devices, including, but not limited to cameras, microphones, display screens, touchscreens, and keypads.

As mentioned, and as illustrated in FIG. 10, the mobile device 1002 also includes the display manager 1012. The display manager 1012 maintains and changes a display presented on the mobile device 1002. In particular, the display manager 1012 works in conjunction with the user input detector 1016 to change a display of the mobile device in response to detecting a user interaction. Additionally, the display manager 1012 works in conjunction with the user interface manager 1018 to display a graphical user interface.

The display manager 1012 also changes the display of the mobile device 1002 in response to receiving triggering code through a connection to another device. For example, the display manager 1012 may receive triggering code over a connection. In response to receiving the triggering code, the display manager 1012 can divide the display of the mobile device 1002 into multiple panes, enabling the mobile device 1002 to display multiple display items within the multiple panes. As referred to herein, a "display item" refers to a visual component (e.g., character, image, video, or user interface). For example, the mobile device 1002 may be able to display separate mobile applications in the multiple panes or the mobile device may display a digital video communication in one pane and a display element in another.

Additionally, the display manager 1012 may modify the size of the multiple panes according to the needs of the items displayed within those panes. In particular, the display manager 1012 may increase the size of a pane if the display item within the pane requires more display space.

As mentioned, and as illustrate in FIG. 10, the mobile device 1002 also includes the display element manager 1014. The display element manager 1014 receives, sends, and provides for display elements. In particular, the display element manager 1014 operates in conjunction with the display manager 1012 to display a display element on the mobile device 1002. In one or more embodiments, the display element manager 1014 can render display elements.

Additionally, the display element manager 1014 modifies and maintains display elements. In particular, the display element manager operates in conjunction with the user input detector 1016 to detect a user input. In response to detecting a user input, the display element manager 1014 modifies the display element in accordance with the particular user interaction.

As mentioned, and as illustrated in FIG. 10, the mobile device 1002 also includes the user input detector 1016. The user input detector 1016 detects, identifies, monitors, receives, processes, captures, and/or records various types of user input. For example, the user input detector 1016 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 1016 operates in conjunction with a number of user input devices (in isolation or in combination), mouse devices, keyboards, track pads, or stylus devices. The user input detector 1016 detects and identifies various types of user interactions with user input devices, such as select events, drag events, scroll events, and so forth. For example, the user input detector 1016 detects one or more touch gestures (e.g., swipe gestures, tap gestures, pinch gestures, or reverse pinch gestures) from a user that forms a user interaction.

The user input detector 1016 communicates with, and thus detects user input with respect to, a variety of programs, applications, plug-ins, operating systems, user interfaces, or other implementations in software or hardware.

As mentioned, and as illustrated in FIG. 10, the mobile device 1002 also includes the user interface manager 1018. The user interface manager 1018 provides, manages, and/or controls a graphical user interface (or simply "user interface") for use with the system 1000. In particular, the user interface manager 1018 can facilitate presentation of information by way of an external component of the mobile device 1002. For example, the user interface manager 1018 can display a user interface by way of a display screen associated with the mobile device 1002. The user interface may be composed of a plurality of graphical components, objects, and/or elements that allow a user to perform a function. The user interface manager 1018 presents, via the mobile device 1002, a variety of types of information, including text, images, video, audio, characters, or other information. Moreover, the user interface manager 1018 provides a variety of user interfaces specific to a variety of functions, programs, applications, plug-ins, devices, operating systems, and/or components of the mobile device 1002.

The user interface manager 1018 can provide a user interface with regard to a variety of operations or applications. For example, the user interface manager 1018 provides a user interface that facilitates selecting, identifying, searching, or downloading digital files. Similarly, the user interface manager 1018 can generate a user interface that facilitates managing, editing, modifying, downloading, uploading, or sending digital images. Additional details with respect to various example user interface elements are described throughout with regard to various embodiments containing user interfaces.

In addition, as illustrated in FIG. 10, the mobile device 1002 also includes the mobile device storage manager 1020. The mobile device storage manager 1020 maintains data for the system 1000. The mobile device storage manager 1020 can maintain data of a type, size, or kind, as necessary to perform the functions of the system 1000.

Additionally, as illustrated in FIG. 10, the mobile device 1002 also includes the camera manager 1040. The camera manager 1040 controls operation of one or more cameras of the mobile device 1002. For example, the camera manager 1040 can activate a camera of the mobile device 1002 and capture images using the camera of the mobile device 1002.

Furthermore, as illustrated in FIG. 10, the server(s) 1004 includes the connection manager 1022. The connection manager 1022 searches for, detects, identifies, accepts, establishes, monitors, and maintains various types of connections. In particular, the connection manager 1022 establishes and maintains one or more connections between devices. For example, the connection manager 1022 may establish a connection between the mobile device 1002 and the support terminal 1006.

As mentioned, and as illustrated in FIG. 10, the server(s) 1004 also includes the video chat manager 1024. The video chat manager 1024 establishes, receives, transmits, and maintains a digital video communication between multiple devices. For example, the video chat manager 1024 may establish and maintain a digital video communication between the mobile device 1002 and another device, such as the support terminal 1006. In particular, the video chat manager 1024 operates in conjunction with the connection manager 1022 to establish and maintain a digital video communication across a connection maintained by server(s) 1004.

As mentioned, and as illustrated in FIG. 10, the server(s) 1004 also includes the display manager 1026. The display manager 1026 receives and transmits items for display on devices. In particular, the display manager 1026 can transmit items sent from one device to another device. For example, the display manager 1026 can transmit a display element sent from the support terminal 1006 to be displayed on the mobile device 1002.

As mentioned, and as illustrated in FIG. 10, the server(s) 1004 also includes the WebSocket 1028. The WebSocket 1028 is a bidirectional communication module that enables a device acting as a server to push data to a client device (e.g., the mobile device 1002), rather than waiting for the client device to send a request for data, which the server then fills. In particular, the WebSocket 1028 operates in conjunction with the display manager 1026 to enable a device acting as a server to push items for display to a device acting as a client. For example, the Web Socket 1028 and the display manager 1026 work in conjunction to enable the support terminal 1006 to push a display element for display to the mobile device 1002.

As mentioned, and as illustrated in FIG. 10, the server(s) 1004 also includes the database 1030. The database 1030 operates as a database repository to store data for retrieval. The database 1030 can operate as an electronic cloud storage system (e.g., an electronic drop box). In particular, the database 1030 stores data for retrieval from a device. For example, the database 1030 can store a modified display element received from the mobile device 1002 until it is overwritten or retrieved by the support terminal 1006.

Additionally, as shown in FIG. 10, the server(s) 1004 includes the blur settings manager 1042. In particular, the blur settings manager 1042 can manage blur settings (e.g., blur degree, blur time) for users of the customer support system 114. To illustrate, the blur settings manager 1042 can associate blur settings for users with corresponding user accounts for the users. The blur settings manager 1042 can store the blur settings in the database 1030 for later retrieval.

As shown in FIG. 10, the server(s) 1004 further includes the blur filter manager 1046. In particular, the blur filter manager 1046 can generate blur filters based on blur settings for users. For example, the blur filter manager 1046 can communicate with the blur settings manager 1042 to retrieve a particular blur setting for a particular user. The blur filter manager 1046 can then generate a blur filter to include attributes (e.g., a blur degree and blur time) based on the blur setting. Additionally, the blur filter manager 1046 can apply the blur filter to each digital video stream presented at a client device (e.g., the support terminal 1006) associated with a particular user during digital video communications involving the user.

Furthermore, as illustrated in FIG. 10, the support terminal 1006 includes the connection manager 1032. The connection manager 1032 searches for, detects, identifies, accepts, establishes, monitors, and maintains various types of connections. In particular, the connection manager 1032 establishes and maintains one or more connections between the support terminal 1006 and another device, such as the mobile device 1002. For example, when establishing a video chat between the mobile device 1002 and the support terminal 1006, the connection manager 1032 will establish and maintain a peer-to-peer connection through the duration of the video chat session.

As mentioned, and as illustrated in FIG. 10, the support terminal 1006 also includes the video chat manager 1034. The video chat manager 1034 initiates, provides for display, and maintains a digital video communication between the support terminal and another device, such as the mobile device 1002. In particular, the video chat manager 1034 operates in conjunction with the connection manager 1032 to establish and maintain a digital video communication between the support terminal 1006 and another device, such as a mobile device 1002.

Additionally, the video chat manager 1034 operates in conjunction with any number of user input/output devices, including, but not limited to cameras, microphones, display screens, touchscreens, and keypads.

As mentioned, and as illustrated in FIG. 10, the support terminal 1006 also includes the display element storage manager 1036. The display element storage manager 1036 stores display element triggers (and, possibly, display elements) that may be selected and transmitted to another device, such as the mobile device 1002. In particular, the display element storage manager 1036 operates in conjunction with the display element transmitter 1038 and the connection manager 1032 to transmit a display element trigger (and, possibly, a display element) across a connection. As mentioned above, in one or more embodiments, the mobile device 1002 stores the display elements corresponding to the display element triggers.

As mentioned, and as illustrated in FIG. 10, the support terminal 1006 also includes the display element transmitter 1038. The display element transmitter 1038 operates to transmit a display element across a connection to another device. In some embodiments, the display element transmitter 1038 operates to transmit a display element trigger (e.g., a check deposit trigger) across the connection. For example, the display element transmitter 1038 can transmit a display element trigger in conjunction with the corresponding display element.

Figure 11:
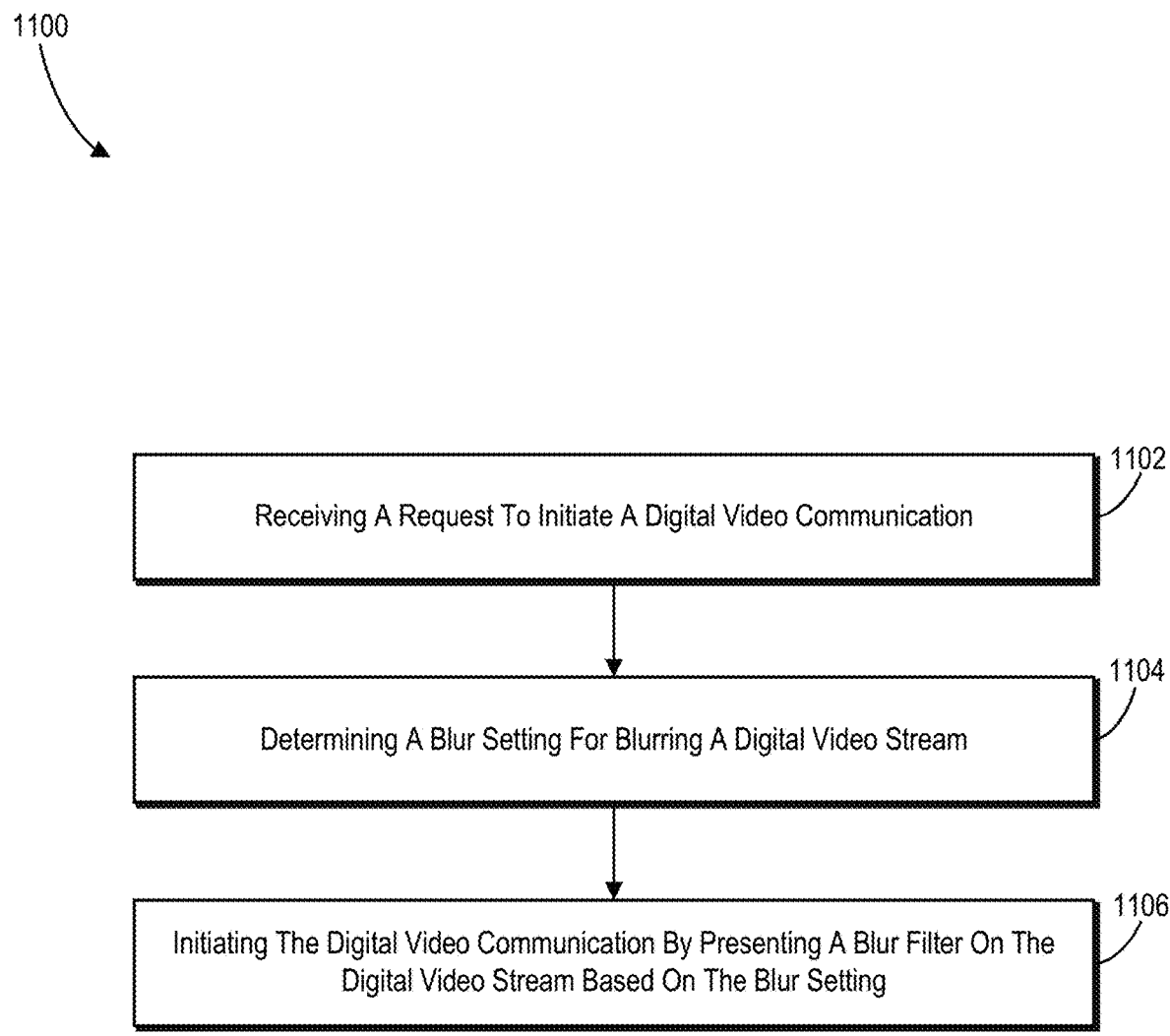
FIG. 11 illustrates a flowchart of a series of acts for blurring a digital video stream upon initiating a digital video communication in accordance with one or more implementations.

Turning now to FIG. 11, this figure shows a flowchart of a series of acts 1100 of generating blur filters for digital video streams during digital video communications based on blur settings. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

As shown, the series of acts 1100 includes an act 1102 of receiving a request to initiate a digital video communication. For example, act 1102 involves receiving a request to initiate a digital video communication between a first user associated with a first user client device and a second user associated with a second user client device. For example, the second user client device can include an agent client device.

The series of acts 1100 also includes an act 1104 of determining a blur setting for blurring a digital video stream. For example, act 1104 involves determining a blur setting associated with the second user indicating to blur a digital video stream from the first user client device at the second user client device.

Act 1104 can involve determining that the blur setting associated with the second user indicates an amount of time to apply the blur filter to the digital video stream during the digital video communication. Act 1104 can further involve determining that the blur setting associated with the second user indicates a degree of blur for the blur filter.

As part of act 1104, or as an additional act, the series of acts 1100 can include presenting a blur setting element corresponding to one or more blur attributes within a graphical user interface at the second user client device. The series of acts 1100 can also include receiving, based on an interaction with the blur setting element, an indication of a selection of one or more values associated with the one or more blur attributes of the one or more blur attributes. For example, the series of acts 1100 can include presenting, within a graphical user interface at the agent client device, a blur time element for controlling an amount of time for displaying the blur filter. The series of acts 1100 can include presenting, within a graphical user interface at the agent client device, a blur degree element for controlling a degree of blur of the blur filter. The series of acts 1100 can then include determining the blur setting based on the one or more values associated with the one or more blur attributes. The series of acts 1100 can also include presenting a blur preview for the blur setting according to the one or more values associated with the one or more blur attributes on a digital preview video at the second user client device.

As part of act 1104, or as an additional act, the series of acts 1100 can include storing the blur setting with the one or more values associated with the one or more blur attributes for a user account of the second user.

Additionally, the series of acts 1100 includes an act 1106 of initiating the digital video communication by presenting a blur filter on the digital video stream based on the blur setting. For example, act 1106 involves initiating, in response to determining the blur setting, the digital video communication by presenting a blur filter on the digital video stream from the first user client device for display at the second user client device. Act 1106 can involve initiating the digital video communication by presenting the blur filter comprising the degree of blur on the digital video stream.

Act 1106 can involve generating the blur filter in response to determining the blur setting associated with the second user. The series of acts 1100 can include generating, in response to determining the blur setting, the blur filter for the digital video stream. For example, the series of acts 1100 can include generating the blur filter including the degree of blur indicated by the blur setting. Act 1106 can then involve applying the blur filter to the digital video stream from the first user client device when displaying the digital video stream at the second user client device. Act 1106 can also involve presenting the digital video stream at the first user client device without the blur filter.

In one or more embodiments, the series of acts 1100 includes removing the blur filter from the digital video stream during the digital video communication after the amount of time. Specifically, the series of acts 1100 can include presenting an unblurred digital video stream at the second user client device after the amount of time.

The series of acts 1100 can also include receiving an additional request to add an additional user associated with an additional user client device to the digital video communication. The series of acts 1100 can then include presenting the blur filter on an additional digital video stream from the additional user client device for display at the second user client device as part of the digital video communication. For example, the series of acts 1100 can include presenting the blur filter on an additional digital video stream for the amount of time corresponding to the blur setting.

The series of acts 1100 can further include applying a blur filter to an additional digital video stream associated with an additional user in an additional digital video communication involving the additional user and the second user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
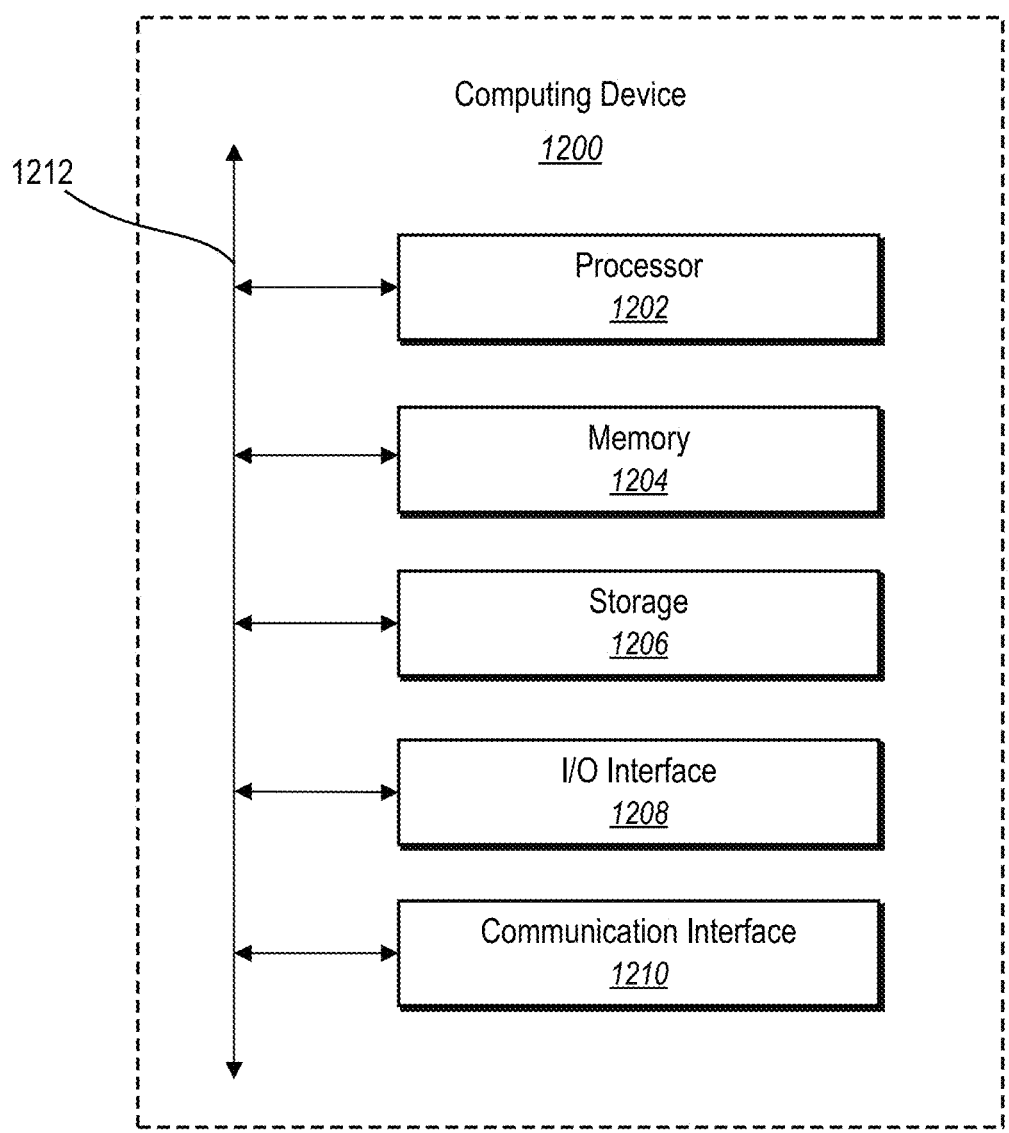
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:

receive a request to initiate a digital video communication between a first user associated with a first user client device and a second user associated with a second user client device;

determine a blur setting stored within a user account of the second user indicating to blur a digital video stream from the first user client device at the second user client device;

initiate, in response to determining the blur setting, the digital video communication by presenting a blur filter on the digital video stream from the first user client device for display at the second user client device;

analyze, while presenting the blur filter on the digital video stream for display at the second user client device, the digital video stream to determine whether the digital video stream contains inappropriate content; and provide, in response to determining that the digital video stream contains inappropriate content, a notification to the second user client device of the inappropriate content and an option to cancel the digital video communication or permanently apply to the blur filter to the digital video stream.

2. The non-transitory computer readable storage medium as recited in claim 1, further comprising instructions that, when executed by the at least one processor, cause the computing device to:

determine that the blur setting stored within the user account of the second user indicates an amount of time to apply the blur filter to the digital video stream; and remove the blur filter from the digital video stream during the digital video communication after the amount of time.

3. The non-transitory computer readable storage medium as recited in claim 1, further comprising instructions that, when executed by the at least one processor, cause the computing device to:

determine the blur setting by determining the amount of time to apply the blur filter based on a trust setting associated with the first user.

4. The non-transitory computer readable storage medium as recited in claim 1, further comprising instructions that, when executed by the at least one processor, cause the computing device to:
determine that the blur setting stored within the user account of the second user indicates a degree of blur for the blur filter; and
initiate the digital video communication by presenting the blur filter comprising the degree of blur on the digital video stream.

5. The non-transitory computer readable storage medium as recited in claim 1, further comprising instructions that, when executed by the at least one processor, cause the computing device to initiate the digital video communication by:
generating the blur filter in response to determining the blur setting stored within the user account of the second user; and
applying the blur filter to the digital video stream from the first user client device when displaying the digital video stream at the second user client device.

6. The non-transitory computer readable storage medium as recited in claim 1, further comprising instructions that, when executed by the at least one processor, cause the computing device to:
receive an additional request to add an additional user associated with an additional user client device to the digital video communication; and
present the blur filter on an additional digital video stream from the additional user client device for display at the second user client device as part of the digital video communication.

7. The non-transitory computer readable storage medium as recited in claim 1, further comprising instructions that, when executed by the at least one processor, cause the computing device to:
present a blur setting element corresponding to one or more blur attributes within a graphical user interface at the second user client device;
receive, based on an interaction with the blur setting element, an indication of a selection of one or more values associated with the one or more blur attributes of the one or more blur attributes; and
determine the blur setting based on the one or more values associated with the one or more blur attributes.

8. The non-transitory computer readable storage medium as recited in claim 7, further comprising instructions that, when executed by the at least one processor, cause the computing device to present a blur preview for the blur setting according to the one or more values associated with the one or more blur attributes on a digital preview video at the second user client device.

9. The non-transitory computer readable storage medium as recited in claim 1, further comprising instructions that, when executed by the at least one processor, cause the computing device to lessen a degree of the blur filter over a period of time such that the digital video stream fades into clarity.

10. A system comprising:
at least one processor; and
a non-transitory computer readable storage medium comprising instructions that, when executed by the at least one processor, cause the system to:
receive a request to initiate a digital video communication between a user associated with a user client device and an agent associated with an agent client device;
determine a blur setting stored within a user account of the agent indicating to blur a digital video stream from the user client device at the agent client device for an amount of time during the digital video communication;
generate, in response to determining the blur setting, a blur filter for the digital video stream from the user client device;
initiate the digital video communication by presenting the digital video stream from the user client device for display at the agent client device with the blur filter applied to the digital video stream for the amount of time corresponding to the blur setting;
analyze, while presenting the blur filter on the digital video stream for display at the agent client device, the digital video stream to determine whether the digital video stream contains inappropriate content; and
provide, in response to determining that the digital video stream contains inappropriate content, a notification to the agent client device of the inappropriate content and an option to cancel the digital video communication or permanently apply to the blur filter to the digital video stream.

11. The system as recited in claim 10, further comprising instructions that, when executed by the at least one processor, cause the system to remove the blur filter from the digital video stream during the digital video communication after the amount of time.

12. The system as recited in claim 10, further comprising instructions that, when executed by the at least one processor, cause the system to:
determine that the blur setting stored within the user account of the agent indicates a degree of blur for the blur filter; and
generate the blur filter including the degree of blur indicated by the blur setting.

13. The system as recited in claim 10, further comprising instructions that, when executed by the at least one processor, cause the system to initiate the digital video communication by:
applying the blur filter to the digital video stream from the user client device when displaying the digital video stream at the agent client device; and
presenting the digital video stream with an additional digital video stream from the agent client device at the user client device without the blur filter.

14. The system as recited in claim 10, further comprising instructions that, when executed by the at least one processor, cause the system to:
receive the request to initiate the digital video communication between the user, the agent, and at least one additional user associated with at least one additional user client device; and
initiate the digital video communication by presenting an additional digital video stream from the at least one additional user client device for display at the agent client device with the blur filter applied to the additional digital video stream for the amount of time corresponding to the blur setting.

15. The system as recited in claim 14, further comprising instructions that, when executed by the at least one processor, cause the system to present the additional digital video stream at the at least one additional user client device without the blur filter.

16. The system as recited in claim 10, further comprising instructions that, when executed by the at least one processor, cause the system to:
   present, within a graphical user interface at the agent client device, a blur time element for controlling the amount of time for displaying the blur filter;
   present, within the graphical user interface, a blur amount element for controlling a degree of blur of the blur filter; and
   display, within the graphical user interface, a blur preview for the blur filter according to the amount of time and the degree of blur for the blur filter.

17. A method comprising:
   receiving, by at least one processor, a request to initiate a digital video communication between a first user associated with a first user client device and a second user associated with a second user client device;
   determining, by the at least one processor, a blur setting stored within a user account of the second user indicating to blur a digital video stream from the first user client device at the second user client device; and
   initiating, by the at least one processor in response to determining the blur setting, the digital video communication by presenting a blur filter on the digital video stream from the first user client device for display at the second user client device;
   analyzing, by the at least one processor while presenting the blur filter on the digital video stream for display at the second user client device, the digital video stream to determine whether the digital video stream contains inappropriate content; and
   providing, by the at least one processor in response to determining that the digital video stream contains inappropriate content, a notification to the second user client device of the inappropriate content and an option to cancel the digital video communication or permanently apply to the blur filter to the digital video stream.

18. The method as recited in claim 17, further comprising:
   determining that the blur setting stored within the user account of the second user indicates an amount of time and a degree of blur for the blur filter;
   generating the blur filter based on the degree of blur; and
   removing the blur filter from the digital video stream during the digital video communication after the amount of time.

19. The method as recited in claim 18, further comprising:
   presenting, within a graphical user interface of the second user client device, a blur time element and a blur amount element;
   determining the amount of time based on an interaction with the blur time element;
   determining the degree of blur based on an interaction with the blur amount element; and
   presenting a blur preview for the amount of time and the degree of blur on a digital preview video at the second user client device.

20. The method as recited in claim 19, further comprising:
   storing the blur setting with the amount of time and the degree of blur for the user account of the second user; and
   applying the blur filter based on the blur setting for an additional digital video communication by accessing the blur setting from the user account.

* * * * *